(12) United States Patent
Teratani

(10) Patent No.: US 6,391,971 B1
(45) Date of Patent: May 21, 2002

(54) SHORT FIBER-REINFORCED RUBBER COMPOSITION AND PNEUMATIC RADIAL TIRE USING THE SAME

(75) Inventor: Hiroyuki Teratani, Iruma (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/438,839

(22) Filed: Nov. 12, 1999

(30) Foreign Application Priority Data

Nov. 13, 1998 (JP) .......................................... 10-324274
Nov. 13, 1998 (JP) .......................................... 10-324275
Nov. 13, 1998 (JP) .......................................... 10-324276

(51) Int. Cl.$^7$ ................................................. C08F 8/30
(52) U.S. Cl. ....................... 525/179; 524/263; 524/264; 524/266; 524/269; 525/184
(58) Field of Search ................................ 525/179, 184; 524/263, 264, 266, 269

(56) References Cited

FOREIGN PATENT DOCUMENTS

| EP | 719662 A2 | 7/1996 |
|---|---|---|
| EP | 760385 A1 | 3/1997 |
| JP | 58-79037 | 5/1983 |
| JP | 59-43041 | 3/1984 |
| JP | 61-225858 | 10/1986 |
| JP | 7-278360 | 10/1995 |

OTHER PUBLICATIONS

Chemical Patent Index, Documentation Abstracts Journal, Wk.9551 (JP 7–278360), Oct. 24, 1995.

*Primary Examiner*—Ana Woodward
(74) *Attorney, Agent, or Firm*—Sughrue Mion, PLLC

(57) ABSTRACT

A short fiber-reinforced rubber composition comprises a master batch (A) comprised of (a) a first diene-based elastomer, (b) a polyolefin having a melting point of 100–150° C. and (c) short fibers of a thermoplastic polymer having amide group in its main chain, and a second diene-based elastomer (B) kneaded with the master batch (A), in which an amount of the component (c) is 5–30 parts by weight based on 100 parts by weight in total of the first diene-based elastomer and the second diene-based elastomer. Further, a rubber sheet made of the short fiber-reinforced rubber composition is inserted in a given zone of the sidewall portion, whereby the stiffness of the sidewall portion is enhanced to simultaneously establish the steering stability and the ride comfort and reduce the rolling resistance.

8 Claims, 3 Drawing Sheets

SHORT FIBER-REINFORCED RUBBER COMPOSITION AND PNEUMATIC RADIAL TIRE USING THE SAME

BACKGROUND OF THE INVENTION

1. Field of the Invention

This invention relates to a short fiber-reinforced rubber composition as well as a pneumatic radial tire using the same, and more particularly to a short fiber-reinforced rubber composition having excellent workability in industrially mass production scale, durability and anisotropy and a pneumatic radial tire simultaneously establishing steering stability and ride comfort and having a low fuel consumption by reinforcing a sidewall portion with such a short fiber-reinforced rubber composition to enhance side stiffness.

2. Description of Related Art

There have been known various short fiber-reinforced rubber compositions having improved modulus, strength and the like by dispersing short fibers into diene-based rubber such as natural rubber or the like. They have been manufactured by a method wherein short organic fibers such as nylon, polyester, vinylon or the like are compounded with a rubber elastomer and then cured, if necessary.

And also, in order to improve the strength, elongation and so on of such a short fiber-reinforced rubber composition, there has been proposed a fiber-reinforced elastic body formed by making an average fiber size of the short fiber such as nylon or the like small and reinforcing with such fine fibers. The production of such an elastic body is carried out by a method wherein curable rubber, nylon fibers and a binder are melt-kneaded, for example, at a temperature higher than a melting point of nylon and the resulting kneaded mass is extruded at a temperature higher than the melting point of nylon and further subjected to drawing or rolling to obtain a fiber-reinforced rubber and another curable rubber and a curing agent are compounded therewith and then cured (JP-A-58-79037, JP-A-59-43041, JP-A-61-225858). The tensile strength, modulus and the like are certainly improved by this method, but since the fiber-reinforced rubber has a structure that fine fibers such as nylon or the like are dispersed in the curable rubber, there is a problem that the pelletization is very difficult. And also, when a great amount of nylon is compounded, the fiber-reinforced rubber becomes very hard, so that it is required to prolong the kneading time or to soften the fiber-reinforced rubber by warming before the compounding with another curable rubber and the like, which comes into problem in the productivity.

As a countermeasure for solving this problem, there is proposed a fiber-reinforced elastic body formed by dispersing fine fibers of thermoplastic polyamide into a matrix of polyolefin and diene-based elastomer and kneading the resulting thermoplastic composition with another diene-based elastomer (JP-A-7-278360).

When the fiber-reinforced elastic body disclosed in JP-A-7-278360 is compared with the conventional fiber-reinforced elastic bodies, the productivity in a laboratory scale and the modulus and fatigue resistance are improved, but the workability in the industrially mass production scale is poor. And also, such a fiber-reinforced elastic body is not necessarily sufficient when it is demanded to provide a higher reinforcing effect in a particular direction as in the reinforcement for a sidewall portion of a tire or the like because the difference between orienting direction of the fiber and direction perpendicular thereto is little.

In usual small-size radial tires for passenger cars, motorcycles and the like, in-plane bending rigidity of a sidewall portion comprising a thin sidewall rubber is particularly small as compared with that of a tread portion comprising a belt of various structures and a thick tread rubber, so that it is difficult to improve the steering stability of the tire, which is dependent upon side stiffness in the tire, without sacrificing the other tire performances such as ride comfort, durability and the like.

In order to directly increase the stiffness of the sidewall portion, there has been proposed a method wherein a fiber-reinforced member having a tire fabric structure of twisted yarns is laid in the sidewall portion adjacent to a carcass ply. In this case, however, the fiber-reinforced member can not follow to a large extension deformation of the sidewall portion at tire-building and vulcanization steps, and it is difficult to manufacture the tire using such a fiber-reinforced member by the conventional production method, and the flexibility of the sidewall portion is extremely lost in a tire product to increase a possibility of losing characteristics inherent to the radial tire. For this end, such a method has not yet been put to practical use.

As a countermeasure for solving the above problem, there have been made various proposals of using high modulus, low heat-shrinkable cords as a carcass cord to increase the stiffness of the sidewall portion and decreasing heat shrinkage in the vulcanization to stabilize the shape of the sidewall portion. In the radial tire for passenger cars, there has recently been proposed an attempt that a usual belt layer of steel cords is combined with an additional belt layer of various organic fiber cords or properties of a coating rubber for these layers are changed to thereby improve the steering stability.

In the above conventional techniques, when the high modulus, low heat-shrinkable cords are used as a carcass cord, the tensile rigidity in the radial direction of the tire coincident with the cord extending direction can effectively be increased by such a high modulus of the cord, but the in-plane bending rigidity of the sidewall portion and the rigidity in the circumferential direction of the tire perpendicular to the radial direction can not directly be increased. And also, the heat shrinking deformation of the tire is certainly decreased by using the low heat-shrinkable cords, but there can not be controlled irregularities of the sidewall portion in the tire under an inflation of an internal pressure resulted from the scattering of an end count (number of cords arranged per constant width) or the scattering of thickness of the sidewall portion in the manufacture of the tire. Therefore, the use of the above cord is not an effective means and can not develop satisfactory effects. On the other hand, when the steel cord belt layer is combined with the additional organic fiber reinforced belt layer using the organic fiber cords such as nylon, polyester or the like, or when the properties of the coating rubber for these belt layers are changed, it is possible to improve the steering stability of the tire resulted from friction force of the tread portion contacting with ground, but the effect of improving the steering stability can not be obtained when the tire is forcedly subjected to input directly deforming the sidewall portion during the running of the vehicle such as slalom running or the like.

Lately, it is advanced to reduce the rolling resistance of the tire from a demand for low fuel consumption in the vehicle, and it tends to more thin the thickness of the carcass ply in the tire for reducing the tire weight, which are difficult to attain only in the above conventional techniques.

SUMMARY OF THE INVENTION

Under the above situations, it is an object of the invention to provide a short fiber-reinforced rubber composition having excellent workability in industrially mass production scale, durability and anisotropy.

It is another object of the invention to provide a pneumatic radial tire simultaneously establishing steering stability and ride comfort and having a low fuel consumption by increasing stiffness of a sidewall portion without damaging characteristics inherent to the radial tire such as ride comfort, durability and the like and complicating the production method, and capable of reducing the rolling resistance.

According to a first aspect of the invention, there is the provision of a short fiber-reinforced rubber composition comprising a master batch (A) comprised of (a) a first diene-based elastomer, (b) a polyolefin having a melting point of 100–150° C. and (c) short fibers of a thermoplastic polymer having amide group in its main chain, wherein the component (c) is dispersed into a matrix formed by dispersing less than 100 parts by weight of the component (b) into 100 parts by weight of a continuous phase of the component (a), and a second diene-based elastomer (B) kneaded with the master batch (A), in which an amount of the component (c) is 5–30 parts by weight based on 100 parts by weight in total of the first diene-based elastomer and the second diene-based elastomer.

In preferred embodiments of the first aspect of the invention, the component (c) is chemically bonded to both the components (a) and (b), and the component (c) has an average diameter of 0.05–1.0 μm and a ratio of average length to average diameter of 10–2000, and an amount of the component (b) occupied in 100 parts by weight of the continuous phase of the component (a) is less than 85 parts by weight, preferably less than 65 parts by weight, more particularly less than 45 parts by weight, and an amount of the component (c) occupied in 100 parts by weight of the continuous phase of the component (a) is not less than 50 parts by weight but less than 110 parts by weight, preferably not less than 50 parts by weight but less than 100 parts by weight.

According to a second aspect of the invention, there is the provision of a pneumatic radial tire comprising a pair of bead portions, a pair of sidewall portions, a tread portion, a radial carcass toroidally extending between a pair of bead cores embedded in the bead portions and wound around the bead core from an inside of the tire toward an outside thereof to form a turnup portion, a belt disposed on an outer surface of a crown portion of the carcass in a radial direction of the tire, and a bead filler disposed above the bead core between the carcass and its turnup portion, wherein a rubber sheet having a thickness of 0.5–2.0 mm is made of a short fiber-reinforced rubber composition as claimed in the first aspect of the invention and inserted in a zone of the sidewall portion so as to at least contact an end with an upper end of the bead filler and make an orienting direction of the short fibers within 0°±45° with respect to a circumferential direction of the tire.

In preferred embodiments of the second aspect of the invention, the rubber sheet is inserted in a height zone of the sidewall portion corresponding to not more than 95%, preferably not more than 80% of a carcass height between a base line at a bottom of the bead core and a center position of a carcass line, and the orienting direction of the short fibers is within 0°±15° with respect to a circumferential direction of the tire.

According to a third aspect of the invention, there is the provision of a pneumatic radial tire comprising a pair of bead portions, a pair of sidewall portions, a tread portion, a radial carcass toroidally extending between a pair of bead cores embedded in the bead portions and wound around the bead core from an inside of the tire toward an outside thereof to form a turnup portion, a belt disposed on an outer surface of a crown portion of the carcass in a radial direction of the tire, and a bead filler disposed above the bead core between the carcass and its turnup portion, wherein a rubber sheet having a thickness of 0.5–2.0 mm is made of a short fiber-reinforced rubber composition as claimed in the first aspect of the invention and inserted in a zone of the sidewall portion so as to have an overlapping margin of at least 0.5 mm with a turnup end of the carcass and make an orienting direction of the short fibers within 0°±45° with respect to a circumferential direction of the tire.

In preferred embodiments of the third aspect of the invention, the rubber sheet is inserted in a height zone of the sidewall portion corresponding to not more than 95%, preferably not more than 80% of a carcass height between a base line at a bottom of the bead core and a center position of a carcass line, and the orienting direction of the short fibers is within 0°±15° with respect to a circumferential direction of the tire.

BRIEF DESCRIPTION OF THE DRAWINGS

The invention will be described with reference to the accompanying drawings, wherein.

DESCRIPTION OF PREFERRED EMBODIMENTS

Figure 1:
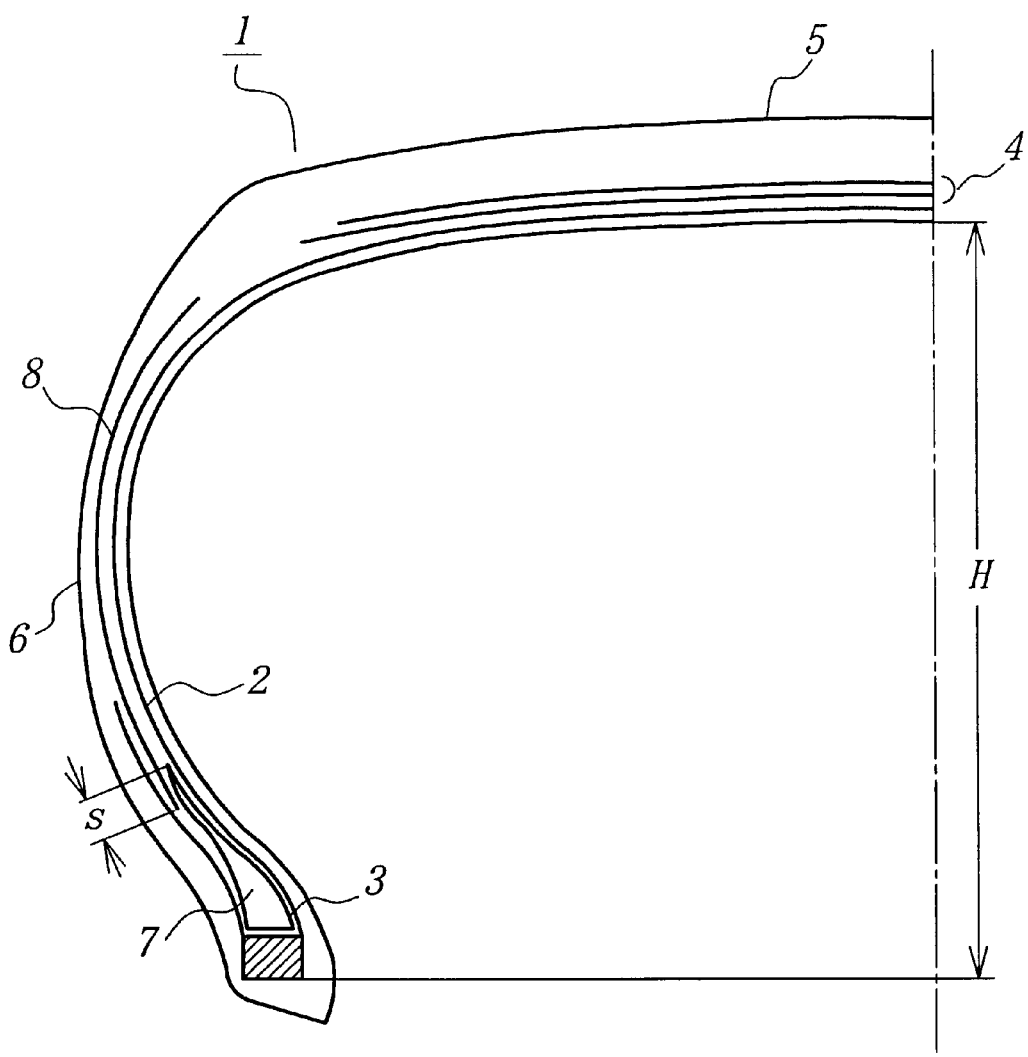
FIGS. 1 to 3 are diagrammatically left-half section views of various embodiments of the pneumatic radial tire according to the invention, respectively.

As the first and second diene-based elastomers used in the short fiber-reinforced rubber composition according to the invention, mention may be made of natural rubber (NR), synthetic polyisoprene rubber (IR), styrene-butadiene copolymer rubber (SBR), polybutadiene rubber (BR), butyl rubber (IIR), chloroprene rubber (CR), chlorinated butyl rubber (Cl-IIR), brominated butyl rubber (Br-IIR), ethylene-propylene rubber (EPDM) and the like. These rubbers may be used alone or in admixture of two or more.

As the thermoplastic polymer having amide group in its main chain and constituting the short fiber, mention may be made of polyamides such as nylon-6, nylon-66, nylon-46, nylon-11, nylon-12, nylon-610, nylon-611, nylon-612, copolymer of nylon-6 and nylon-66 and the like, and a mixture of two or more polyamides. The polyamide is favorable to have a molecular weight of not less than 8000 and a melting point of 170–240° C. from viewpoint of the kneading temperature in the preparation of the master batch.

The amount of the polyamide short fibers compounded is 5–30 parts by weight based on 100 parts by weight in total of the first diene-based elastomer and the second diene-based elastomer. When the compounding amount is less than 5 parts by weight, the effect according to the invention can not be developed, while when it exceeds 30 parts by weight, the workability is considerably degraded and the preparation becomes difficult. And also, the amount of the short fibers as the component (c) occupied in 100 parts by weight of the continuous phase of the component (a) is not less than 50 parts by weight but less than 110 parts by weight, preferably not less than 50 parts by weight but less than 100 parts by weight. When the amount is less than 50 parts by weight, it is difficult to develop the effect according to the invention, while when it is not less than 110 parts by weight, the workability of the master batch is degraded and the preparation becomes difficult.

When the compounding amount of the short fibers as the component (c) is within the above defined range, the component (c) is dispersed in the matrix formed by dispersing the component (b) in the continuous phase of the component (a) and is possible to maintain a chemically good bonding state to the components (a) and (b).

The polyamide short fibers as the component (c) are circular or shape similar thereto at its section and have an average diameter (D) of 0.05–1.0 μm, preferably 0.1–0.8 μm, wherein not less than 90% by weight of the component (c) have a diameter of not more than 1 μm. When the average diameter (D) is less than 0.05 μm, the breakage is apt to be caused in the kneading, while when it exceeds 1.0 μm, the fatigue resistance is degraded due to stress concentration produced at end portions of the short fibers. And also, the short fibers are favorable to have an average length (L) of not less than 10 μm, wherein not less than 90% by weight thereof have a length of not more than 1000 μm. When the average length (L) is less than 10 μm, the ratio of length to diameter (L/D) is small and the orientation is degraded. The ratio L/D in the component (c) is favorable to be 10–2000. As the ratio becomes large, the short fibers are easily oriented, but when the ratio exceeds 2000, it is difficult to ensure the dispersibility in rubber. While, when the ratio is less than 10, the good anisotropy can not be obtained. As an ideal shape of the short fiber, the diameter is small and the ratio (L/D) is large. Moreover, the short fibers as the component (c) are melt-drawn in rubber to render into microfibers, whereby the considerable improvement of the fatigue resistance can be realized.

The polyamide short fibers as the component (c) are chemically bonded to the components (a) and (b) in the master batch (A). As such a chemical bond, primary bond with a coupling agent, graft bond and the like are desirable.

As the polyolefin having a melting point of 100–150° C. used in the master batch (A) according to the invention, mention may be made of low-density polyethylene (L-PE), high-density polyethylene (H-PE), polypropylene (PP) and the like. Preferably, polyethylene having a melting point of 100–140° C. is used.

The reason why the melting point of the polyolefin as the component (b) is limited to 100–150° C. is due to the fact that when the melting point is lower than 100° C., the weldability to the short fiber lowers, while when it is higher than 150° C., the processability is degraded and hence the polyolefin can not be melted in the rubber kneading. The melting point is preferably 100–140° C.

In order to realize the sufficient dispersion of the polyolefin in the matrix, it is favorable that the temperature in the kneading of the polyolefin, i.e. the highest kneading temperature when producing a master batch is higher by not less than 3° C. than the melting point of the polyolefin.

The amount of the polyolefin compounded as the component (b) is less than 100 parts by weight, preferably less than 85 parts by weight, more particularly less than 65 parts by weight, most preferably less than 45 parts by weight per 100 parts by weight of the continuous phase of the first diene-based elastomer as the component (a). Thus, the amount of the polyolefin is always made smaller than the amount of the first diene-based elastomer, whereby the master batch comprised of the diene-based elastomer continuous phase can be obtained. If the compounding amount of the polyolefin is equal to or somewhat larger than the amount of the first diene-based elastomer, the master batch is the polyolefin continuous phase and the durability is largely degraded.

In the production of the short fiber-reinforced rubber composition according to the invention, the master batch (A) is first prepared by reinforcing the first diene-based elastomer as the component (a) with the polyolefin as the component (b) and the polyamide short fibers as the component (c), which is further kneaded with the second diene-based elastomer as the component (B). A production example is described below. Moreover, the compounding amount of each component is as mentioned above.

(1) The first diene-based elastomer is kneaded with an amine-based antioxidant for 1–3 minutes.

(2) The polyolefin and polyamide resin are charged and kneaded, during which the temperature is raised above melting points of the polyolefin and polyamide to melt them.

(3) If necessary, a coupling agent such as phenolic resin oligomer or the like, a silane coupling agent and the like are added and the kneading is continued to obtain a master batch (A).

(4) The master batch is extruded through an extruder and drawn to obtain a rubber composition reinforced with polyamide short fibers and the polyolefin. The polyamide short fibers are formed from the polyamide resin during the extrusion.

That is, the rubber component (first diene-based elastomer) is reinforced with the polyolefin and the polyamide short fibers through graft bond or primary bond with the coupling agent.

(5) To the resulting master batch (A) is properly added the second diene-based elastomer so as to adjust the amounts of the polyolefin and the polyamide short fibers to desired levels, and further additives usually used in rubber industry other than curing agent, vulcanization accelerator and accelerator promoter are added, which are kneaded in a Banbury mixer, kneader or the like. As the additive, mention may be made of organic unsaturated aliphatic acid (if necessary), filler such as carbon black, silica or the like, zinc white, antioxidant, stearic acid, process oil and so on. The kneading at this step is carried out for 30 seconds to 10 minutes so that the final kneading temperature is made higher by not less than 3° C. than the melting point of the polyolefin, which is to ensure the dispersion of the welded mixture of the polyolefin and the polyamide short fibers.

(6) Finally, the curing agent, vulcanization accelerator and accelerator promoter are added and kneaded so as to sufficiently disperse them to obtain the given rubber composition.

As a preferable example of the organic unsaturated aliphatic acid, there is mentioned a dehydrated aliphatic acid of castor oil. The dehydrated aliphatic acid of castor oil is obtained by subjecting the castor oil to dehydration reaction.

In case of the dehydrated aliphatic acid of castor oil, 9,11-octadecadienoic acid is the main component as a conjugated dienoic acid. In the other organic unsaturated aliphatic acids is mainly included a non-conjugated octadecadienoic acid. As the other non-conjugated unsaturated apliphatic acid, mention may be made of linoleic acid, linolenic acid and the like.

The organic unsaturated aliphatic acid has an effect of largely improving the processability and anisotropy and is preferably compounded in an amount of 0.5–10 parts by weight based on 100 parts by weight of the rubber component. In the rubber composition according to the invention, it is more effective to use an aliphatic acid usually used in the rubber industry such as stearic acid or the like together with the organic unsaturated aliphatic acid.

In the rubber composition according to the invention, the first diene-based elastomer is chemically bonded to the polyamide short fibers and also the polyolefin is welded to the polyamide short fibers, so that the anisotropy can largely be improved by combining the improvement of resistance to breakage and fatigue resistance inherent to the polyamide with the improvement of the anisotropy inherent to the polyolefin. And also, when the organic unsaturated aliphatic acid is further compounded, the anisotropy can be more enhanced as mentioned above.

A concrete production example of the master batch as mentioned above is described below. The master batch can be produced by the following steps:

(1) step of preparing a matrix comprised of the component (a) and the component (b) among the three components (a), (b) and (c);

(2) step of reacting the component (c': polyamide resin) with a binder;

(3) step of melt-kneading the component (c') reacted with the binder with the above matrix; and (4) step of extruding the resulting kneaded mass at a temperature higher than the melting point of the component (c') and then drawing and/or rolling at a temperature lower than the melting point of the component (c').

At first, the step (1) of preparing the matrix comprised of the components (a) and (b) is described below.

In the preparation of the matrix comprised of the components (a) and (b), for example, the component (b) is melt-kneaded with a binder, which is then melt-kneaded with the component (a). Alternatively, the components (a) and (b) may be melt-kneaded with the binder. The melt-kneading may be carried out in an apparatus usually used in the kneading of resin or rubber. As the apparatus, mention may be made of Banbury mixer, kneader, kneader extruder, open rolls, uniaxial kneading machine, biaxial kneading machine and the like.

The amount of the binder is within a range of 0.1–2.0 parts by weight, preferably 0.2–1.0 part by weight based on 100 parts by weight of the component (b). When the amount of the binder is less than 0.1 part by weight, the matrix having a high strength can not be obtained, while when it exceeds 2.0 parts by weight, the matrix having a high modulus can not be obtained.

As the binder, use may be made of a silane coupling agent, a titanate coupling agent, and ones usually used as a high polymer coupling agent such as a novolac type alkyl phenol formaldehyde initial condensate, a resol type alkyl phenol formaldehyde initial condensate, a novolac type phenol formaldehyde initial condensate, a resol type phenol formaldehyde initial condensate, an unsaturated carboxylic acid and a derivative thereof, an organic peroxide and the like. Among these coupling agents, the silane coupling agent is preferable because it hardly gelates the components (a) and (b) and can form a strong bond at an interface between these components. As the silane coupling agent, it is favorable to use a silane coupling agent having a group easily detaching by catching hydrogen atom from exterior, such as a vinyl group, and/or a polar group such as alkoxy group and the like, which includes vinyl trimethoxy silane, vinyl triethoxy silane, vinyl tris(β-methoxyethoxy) silane, vinyl triacetyl silane, γ-methacryloxy propyl trimethoxy silane, γ-[N-(β-methacryloxyethyl)-N,N-dimethylammonium-(chloride)] propyl methoxy silane, styryldiamino silane and the like.

In case of using the silane coupling agent as the binder, an organic peroxide may be used together. In this case, there is favorably used an organic peroxide having one minute half-life temperature equal to or higher by about 30° C. than a higher melting point between the melting point of the component (a) and the melting point of the component (b). Concretely, the one minute half-life temperature is about 110–200° C. As the organic peroxide, mention may be made of 1,1-di-t-butylperoxy-3,3,5-trimethylcyclohexane, 1,1-di-t-butylperoxycyclohexane, 2,2-di-t-butylperoxybutane, 4,4-di-t-butylperoxy valeric acid n-butyl ester, 2,2-bis(4,4-di-t-butylperoxycyclohexane) propyl, peroxyneodecanoic acid 2,2,4-trimethylpentyl, peroxyneodecanoic acid t-butyl, peroxyacetic acid t-butyl, peroxylauric acid t-butyl, peroxybenzoic acid t-butyl, peroxyisophthalic acid t-butyl and the like.

The amount of the organic peroxide used is favorably within a range of 0.01–1.0 part by weight based on 100 parts by weight of the component (b).

When the silane modification is carried out by melt-kneading the components (a) and (b) with the silane coupling agent, if the natural rubber, polyisoprene or isoprene-based copolymer is used as the component (a), the organic peroxide may not necessarily be used because the rubber having isoprene structure is capable of inducing the breakage of the main chain through mechanochemical reaction in the kneading to produce a peroxide having —COO group in a terminal of the main chain, which is considered to have substantially the same action as the organic peroxide.

The steps (2) and (3) for kneading the component (c) with the matrix is described below.

The component (c') is melt-kneaded with a binder at the step (2) and then melt-kneaded with the matrix at the step (3), or the component (c') may be directly melt-kneaded with the matrix in the presence of the binder at the step (3) without conducting the step (2). The melt-kneading can be carried out in an apparatus usually used in the kneading of resin or rubber such as Banbury mixer, kneader, kneader extruder, open rolls, uniaxial kneading machine, biaxial kneading machine or the like likewise the case of preparing the matrix.

The amount of the binder to be compounded with the component (c') is within a range of 0.1–5.5% by weight, preferably 0.2–5.5% by weight, more particularly 0.2–3% by weight based on 100% by weight in total of the component (c') and the binder.

As the binder, use may be made of a silane coupling agent, a titanate coupling agent, and ones usually used as a high polymer coupling agent such as a novolac type alkyl phenol formaldehyde initial condensate, a resol type alkyl phenol formaldehyde initial condensate, a novolac type phenol formaldehyde initial condensate, a resol type phenol formaldehyde initial condensate, an unsaturated carboxylic acid and a derivative thereof, an organic peroxide and the like. Among these coupling agents, the silane coupling agent is most preferable because it hardly gelates the component (c') and can form a strong bond at an interface to the matrix. As the silane coupling agent, mention may be made of ones having a group capable of bonding to nitrogen atom in —NHCO— bond of the component (c') by dehydration reaction, dealcohol reaction or the like such as vinyl group, alkoxy group and the like, which concretely include vinyl trimethoxy silane, vinyl triethoxy silane, vinyl tris(β-methoxyethoxy) silane, vinyl triacetyl silane, γ-methacryloxy propyl trimethoxy silane, γ-[N-(β-methacryloxyethyl)-N,N-dimethylammonium(chloride)] propyl methoxy silane, N-β(aminoethyl) γ-aminopropyl trimethoxy silane, styryldiamino silane, γ-ureidopropyl triethoxy silane and the like.

At the step (3), the temperature for melt-kneading the component (c') with the matrix is required to be higher than the melting point of the component (c'). If the melt-kneading is carried out at a temperature lower than the melting point of the component (c'), the resulting kneaded mass does not contain fine particles of the component (c') dispersed thereinto, so that when such a kneaded mass is spun and drawn at the subsequent step (4), the component (c') can not form short fibers in the master batch. Moreover, the melt-kneading temperature is favorable to be a temperature higher than the melting point or Vicat softening point of the polyolefin as the component (b).

The kneaded mass obtained at the step (3) is extruded through a spinneret, a die for inflation or a T-die and then drawn or rolled at the step (4).

At the step (4), the fine particles of the component (c') in the kneaded mass are shaped into short fibers through the spinning or extruding and subjected to subsequent drawing or rolling to render these short fibers into stronger fibers. Therefore, the spinning or extruding is required to be carried out at a temperature higher than the melting point of the component (c'), while the drawing or rolling is required to be carried out at a temperature lower than the melting point of the component (c').

The spinning or extruding and subsequent drawing or rolling can be carried out, for example, by a method wherein the kneaded mass is extruded through the spinneret to form a string or a thread and then taken up on a bobbin or the like while applying a draft. The application of a draft means that a take-up rate is made higher than a spinning rate. A ratio of take-up rate/spinning rate (draft ratio) is within a range of 1.5–100, preferably 2–50, more particularly 3–30.

The step (4) can be carried out by continuously rolling the spun product of the kneaded mass through a rolling roll or the like. Alternatively, the kneaded mass may be extruded through the inflation die or T-die and taken up on a roll while applying the draft or rolled through the rolling roll or the like.

The master batch (A) formed after the drawing or rolling is favorable to be shaped into pellets. Because, the pellets of the master batch can uniformly be kneaded with the second diene-based elastomer (B).

The function of the short fiber-reinforced rubber composition according to the invention will be described in detail below in comparison with the fiber-reinforced elastic body disclosed in JP-A-7-278360.

In the short fiber-reinforced rubber composition according to the invention, the master batch (A) is a continuous phase of the diene-based elastomer, wherein the component (b) and the component (c) are existent in the component (a), so that there are obtained a chemical effect that the affinity with the component (B) is largely increased in the kneading and a dynamic effect that the viscosity of the master batch (A) itself lowers as compared with a continuous phase of polyolefin as mentioned later. Such chemical and dynamic effects largely contribute to the following points.

At first, when the master batch (A) is kneaded with the component (B) and an adequately selected compounding agent to prepare the short fiber-reinforced rubber composition according to the invention, there is obtained an ideal temperature rising curve because rotor slip is little from an initial kneading stage and shear is efficiently applied. Based on such an adequate temperature rise, the temperature of kneading rubber prematurely reaches to the melting point of polyolefin as the component (b) to fuse polyolefin phase, whereby the polyamide short fibers of the component (c) are microscopically dispersed thereinto.

On the other hand, as disclosed in JP-A-7-278360, when the master batch is a continuous phase of polyolefin, the diene-based elastomer and short fibers of the thermoplastic polymer are existent in the polyolefin phase, so that the affinity with the second diene-based elastomer is chemically low and the master batch is dynamically very rigid and hardly deforms and holds its shape until the temperature reaches to the melting point of polyolefin (usually 100–140° C.). As a result, the master batch and the second diene-based elastomer hold an incompatible state with each other at an initial kneading stage (usually stage of 60–100° C.) because the master batch is low in the affinity and rigid.

As a factor of temperature rise in usual rubber kneading, there are ①the affinity between the starting materials is high and ②the starting material is viscous. When the factors ① and ② are satisfied in the kneading, shear is efficiently applied and the temperature rise is attained by spontaneous heat generation of the starting material. On the contrary, when the starting materials are held at the incompatible state with each other, rotor slip is induced at an important region governing the temperature rise at the initial kneading stage and also shear is hardly applied, so that the good temperature rise can not be expected for the kneading time. That is, the temperature is slowly raised through the long-time rotor slip to attain the kneading temperature equal to the melting point of polyolefin, at where the short fibers are first disentangled from the rigid form and dispersed into the polyolefin continuous phase.

In a small capacity mixer at a laboratory scale (50–5000 cc), a clearance of a rotor is very small, and shear is easily applied, and the temperature control is easy because the capacity is small, and also the temperature distribution can be uniformized. Therefore, even when the master batch is the polyolefin continuous phase, the rubber composition of uniformly dispersed state can be obtained in such a mixer.

In an industrially large capacity mixer (50–500 liters), however, the application of shear becomes ununiform and the temperature control is rough, so that the temperature distribution in the kneaded rubber becomes very ununiform. Therefore, when the master batch is the polyolefin continuous phase, the short fibers are dispersed in portion of the master batch arriving at the melting point of the polyolefin, but the diene-based elastomer, polyolefin and short fibers are existent in the remaining portion of the master batch not arriving at the melting point of the polyolefin due to insufficient temperature rise as they are, so that the resulting rubber composition is very ununiform. Such non-dispersed portions form large breaking nuclei in a cured rubber, which are a main factor of largely degrading the durability of the cured rubber.

In the invention, the master batch is not the polyolefin continuous phase but is the continuous phase of the diene-based elastomer, so that the rotor slip is not induced even in the industrially large capacity scale and the workability is excellent. The resulting short fiber-reinforced rubber composition is good in the dispersibility and develops excellent effects on the durability and anisotropy. As a result, when the short fiber-reinforced rubber composition is applied to a given region of the sidewall portion of the pneumatic radial tire as mentioned later, it is possible to simultaneously improve the steering stability and the ride comfort and reduce the rolling resistance.

In the pneumatic radial tire according to the invention, a rubber sheet having a thickness of 0.5–2.0 mm is made from the above short fiber-reinforced rubber composition and is inserted into a given region of the sidewall portion. When the thickness is less than 0.5 mm, the effect by the insertion of the rubber sheet is not obtained, while when it exceeds 2.0 mm, the effect accompanied with the increase of the thickness is not obtained but also the degradation of the rolling resistance is developed due to the increase of the tire weight.

In the invention, an end of the rubber sheet is required to at least contact with an upper end of the bead filler, whereby the effect of reinforcing the sidewall portion can be enhanced. Preferably, an overlapping margin between the rubber sheet and the bead filler is not less than 1.0 mm. Alternatively, the rubber sheet is required to have an overlapping margin of at least 0.5 mm, preferably not less than 1.0 mm with a turnup end of the carcass. In the latter case, the rubber sheet and the turnup end of the carcass can be co-cured in the curing of the tire to enhance the reinforcing effect. Moreover, when the carcass is comprised of plural plies, the rubber sheet is overlapped with the turnup end of at least one of the carcass plies.

In the rubber sheet, the orienting direction of the short fibers is set within 0°±45°, preferably 0°±15° with respect to a circumferential direction of the tire. Thus, the modulus of the rubber sheet can be increased to selective input. Preferably, the setting of such orienting angle is symmetrical with respect to right and left of the tire.

In the pneumatic radial tire according to the invention, the rubber sheet is inserted in a height zone of the sidewall portion corresponding to not more than 95%, preferably not more than 80% of a carcass height (H) between a base line at a bottom of the bead core and a center position of a carcass line. When the height region exceeds 95%, the rolling resistance is largely increased. In case that the rubber sheet is not overlapped with the bead filler, an inner end of the rubber sheet in the radial direction is located upward at a distance from an upper end of the bead filler by not less than 5% of the carcass height. Moreover, in order to provide the good reinforcing effect, the rubber sheet is arranged over a region of not less than 10%, preferably not less than 20%, more particularly not less than 35% of the carcass height as a length in the radial direction of the tire.

In FIG. 1 is shown a first embodiment of the pneumatic radial tire according to the invention. The tire 1 comprises a pair of bead portions, a pair of sidewall portions 6, a tread portion 5, a radial carcass 2 of a single rubberized cord ply toroidally extending between a pair of bead cores 3 embedded in the bead portions and wound around the bead core from an inside of the tire toward an outside thereof to form a turnup portion, a belt 4 disposed on an outer surface of a crown portion of the carcass 2 in a radial direction of the tire and comprised of two belt layers, and a bead filler 7 disposed above the bead core between the carcass and its turnup portion. Further, a rubber sheet 8 made of the short fiber-reinforced rubber composition is inserted in a region of the sidewall portion 6 so as to contact an end portion with an upper end portion of the bead filler 7 and extend between the bead filler and the turnup portion of the carcass ply 2.

Figure 2:
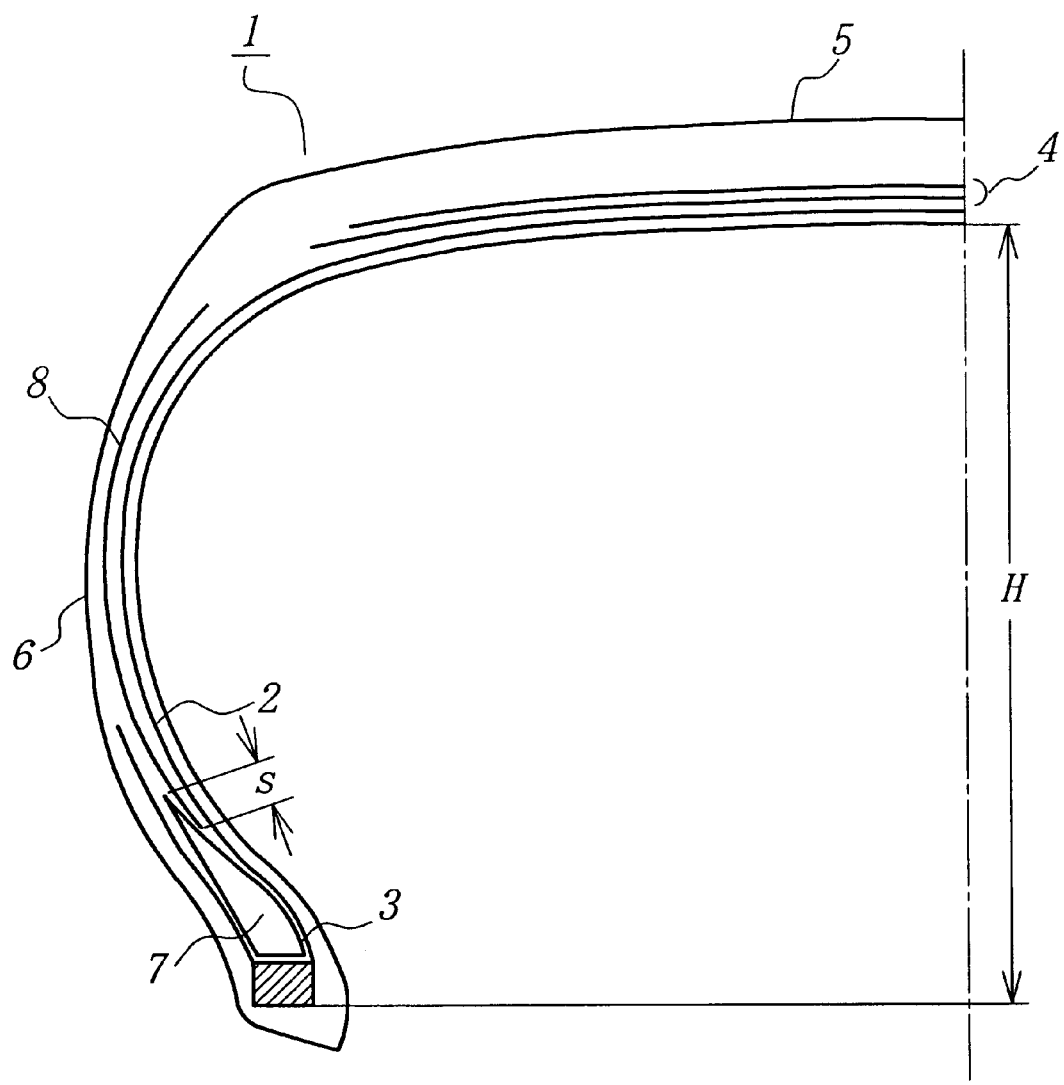

In FIG. 2 is shown a second embodiment of the pneumatic radial tire according to the invention, which is a modified embodiment of FIG. 1. In this case, the rubber sheet 8 is extended between the bead filler 7 and the main body of the carcass ply 2 while contacting with the upper end portion of the bead filler 7.

Figure 3:
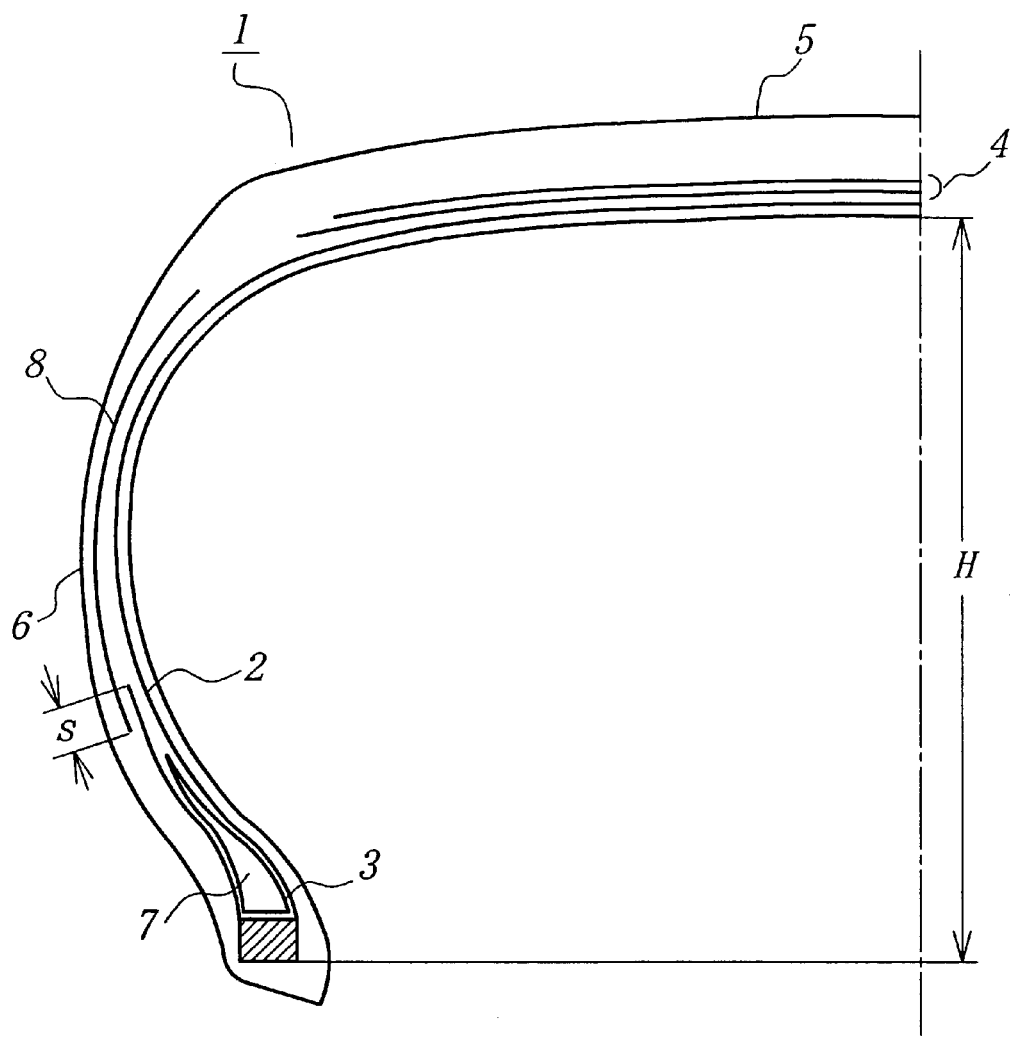

In FIG. 3 is shown a third embodiment of the pneumatic radial tire according to the invention, which is another modified embodiment of FIG. 1. In this case, the rubber sheet 8 is inserted in a region of the sidewall portion 6 so as to overlap with an end of the turnup portion of the carcass ply 2 and locate an inner end of the rubber sheet in the radial direction upward from the upper end of the bead filler 7.

In all of the above embodiments, the similar effect can be obtained. Moreover, the thickness of the rubber sheet 8, overlapping margin s of the rubber sheet 8 with the bead filler 7 or the turnup end, inserting region of the rubber sheet 8 in the sidewall portion 6 and orienting direction of short fibers in the rubber sheet 8 are properly selected within the ranges as defined above.

The following examples are given in illustration of the invention and are not intended as limitations thereof.

There is first described the preparation of a master batch used for the following examples and comparative examples.
[Preparation of Master Batches 1–4]

There are used natural rubber (NR, SMR-L) as a component (a), high density polyethylene (PE) (Mitsubishi Polyethy HJ560, trade name, made by Mitsubishi Chemical Corporation melting point: 135° C.) as a component (b), and nylon-6 (PA) (Ubenylon 1030B, trade name, made by Ube Industries, Ltd. melting point: 215–220° C., molecular weight: 30,000) as a component (c'), respectively. The component (b) is modified by melt-kneading with 0.5 part by weight of γ-methacryloxypropyl trimethoxy silane and 0.1 part by weight of 4,4-di-t-butylperoxy valeric acid n-butyl ester based on 100 parts by weight of the component (b). The component (c') is modified by melt-kneading with 1.0 part by weight of N-β(aminoethyl) γ-aminopropyl trimethoxy silane based on 100 parts by weight of the component (c').

These modified components (b), (c') and the component (a) are used to form a master batch as follows. At first, the modified component (b) is kneaded with the component (a) according to a compounding recipe shown in Table 1 in a Banbury mixer to prepare a matrix, which is damped at 170° C. and pelletized. Then, the matrix and the modified component (c') are kneaded according to a compounding recipe shown in Table 1 in a biaxial kneading machine heated to 240° C. The resulting kneaded mass is extruded through a uniaxial extruder in form of a string, which is drawn at a draft of 10 and pelletized in a pelletizer. In the thus obtained master batches 1–3, the continuous phase is formed by natural rubber, while the continuous phase is formed by the high density polyethylene in the master batch 4. The pellet is refluxed in a mixed solvent of o-dichlorobenzene and xylene to remove polyolefin and NR and then the shape and diameter of the remaining fibers are observed by means of an electron microscope to obtain results as shown in Table 1.

TABLE 1

|  |  | Kind of master batch | | | |
|---|---|---|---|---|---|
|  |  | 1 | 2 | 3 | 4 |
| Compounding recipe | NR | 100 | 100 | 100 | 100 |
| (part by weight) | PE | 40 | 60 | 80 | 100 |
|  | PA | 100 | 100 | 100 | 100 |
| Average diameter of PA (D) (μm) | | 0.2 | 0.2 | 0.2 | 0.2 |
| Length of PA (L) (μm) | | 50 | 50 | 50 | 50 |
| L/D of PA | | 100 | 100 | 100 | 100 |

EXAMPLES 1–6, COMPARATIVE EXAMPLES 1–8

Various short fiber-reinforced rubber compositions are prepared according to a compounding recipe as shown in Tables 2 and 3 by using various master batches shown in Table 1 in an industrial mass production type Banbury mixer of 240 liters.

With respect to these rubber compositions, 50% tensile modulus at room temperature and 100° C. (Mod 50%) is measured by using a dumbbell No. 3 specimen according to JIS K6301-1995 in an orienting direction of short fiber and in a direction perpendicular to the orientation of short fiber, respectively.

A bending fatigue test according to JIS K6301-1995 is carried out to measure bending times required until the occurrence of crack length of 5 mm when the orienting direction of the short fiber is a longitudinal direction of a specimen (at a bending rate of 300 times/min). The bending times at the crack length of 5 mm is represented by an index on the basis that a comparative example corresponding to the compounding recipe of the example is 100. The larger the index value, the better the fatigue resistance.

Furthermore, the kneading time at the damping temperature of 150° C. is represented by an index on the basis that a comparative example corresponding to the respective example is 100. The smaller the index value, the better the kneading.

Moreover, the dispersion level of the short fibers in an uncured rubber sheet is evaluated as follows. The uncured rubber sheet is cooled down to about −100° C. in a liquid nitrogen and shock is applied at a frozen state to obtain a broken section, which is observed by means of an optical microscope (magnification: 175 times) to measure the number of aggregates of not less than 100 $\mu$m in size existing in the observation area of 1 cm×1 cm. The observation number of 1 cm$^2$ is 100 and the dispersion level is represented by the number of aggregates existing per 1 cm$^2$.

The thus obtained results are also shown in Tables 2 and 3.

TABLE 2

| | Example 1 | Comparative Example 1 | Example 2 | Comparative Example 2 | Example 3 | Comparative Example 3 | Example 4 | Comparative Example 4 |
|---|---|---|---|---|---|---|---|---|
| Short fiber-reinforced rubber composition No. | 1 | 2 | 3 | 4 | 5 | 6 | 7 | 8 |
| Kind of master batch | 2 | 4 | 2 | 4 | 2 | 4 | 2 | 4 |
| Compounding recipe (part by weight) | | | | | | | | |
| total amount of master batch (A) | 13 | 15 | 26 | 30 | 39 | 45 | 78 | 90 |
| (component (a), NR) | (5) | (5) | (10) | (10) | (15) | (15) | (30) | (30) |
| (component (b), PE) | (3) | (5) | (6) | (10) | (9) | (15) | (18) | (30) |
| (component (c), PA) | (5) | (5) | (10) | (10) | (15) | (15) | (30) | (30) |
| second elastomer (B) | | | | | | | | |
| NR | 45 | 45 | 40 | 40 | 35 | 35 | 20 | 20 |
| SBR (#1500) | 50 | 50 | 50 | 50 | 50 | 50 | 50 | 50 |
| carbon black | 45 | 45 | 45 | 45 | 45 | 45 | 45 | 45 |
| aromatic oil | 10 | 10 | 10 | 10 | 10 | 10 | 10 | 10 |
| stearic acid | 1.5 | 1.5 | 1.5 | 1.5 | 1.5 | 1.5 | 1.5 | 1.5 |
| zinc white | 3.0 | 3.0 | 3.0 | 3.0 | 3.0 | 3.0 | 3.0 | 3.0 |
| antioxidant | 2.0 | 2.0 | 2.0 | 2.0 | 2.0 | 2.0 | 2.0 | 2.0 |
| vulcanization accelerator NS * | 1.5 | 1.5 | 1.5 | 1.5 | 1.5 | 1.5 | 1.5 | 1.5 |
| sulfur | 3.0 | 3.0 | 3.0 | 3.0 | 3.0 | 3.0 | 3.0 | 3.0 |
| RT Mod 50% | | | | | | | | |
| orienting direction of short fiber (MPa) | 2.42 | 2.40 | 5.22 | 5.15 | 12.40 | 12.10 | 19.60 | 19.89 |
| direction perpendicular to orientation of short fiber (MPa) | 1.41 | 1.43 | 1.65 | 1.75 | 2.32 | 2.49 | 3.78 | 4.12 |
| index of anisotropy | 1.72 | 1.68 | 3.16 | 2.94 | 5.34 | 4.86 | 5.19 | 4.83 |
| 100° C. Mod 50% | | | | | | | | |
| orienting direction of short fiber (MPa) | 2.64 | 2.62 | 3.92 | 3.70 | 8.51 | 8.30 | 11.10 | 11.60 |
| direction perpendicular to orientation of short fiber (MPa) | 1.15 | 1.15 | 1.42 | 1.45 | 1.81 | 1.88 | 3.37 | 3.64 |
| index of anisotropy | 2.30 | 2.28 | 2.76 | 2.55 | 4.70 | 4.41 | 3.29 | 3.19 |
| Bending fatigue test (times until occurrence of crack length of 5 mm (index)) | 105 | 100 | 115 | 100 | 128 | 100 | 111 | 100 |
| Index of kneading time (damping temperature: 150° C.) (index) | 95 | 100 | 90 | 100 | 86 | 100 | 84 | 100 |
| Dispersion level in uncured rubber sheet (aggregate/cm$^2$) | 0 | 2.2 | 0 | 5.1 | 0 | 8.3 | 0 | 14.1 |

* N-tert-butyl-2-benzothiazolyl sulfenamide

TABLE 3

| | Comparative Example 5 | Comparative Example 6 | Comparative Example 7 | Comparative Example 8 | Example 5 | Example 6 |
|---|---|---|---|---|---|---|
| Short fiber-reinforced rubber composition No. | 9 | 10 | 11 | 12 | 13 | 14 |
| Kind of master batch | 2 | 4 | 2 | 4 | 1 | 3 |
| Compounding recipe (part by weight) | | | | | | |
| total amount of master batch (A) | 6.5 | 7.5 | 91 | 105 | 36 | 42 |
| (component (a), NR) | (2.5) | (2.5) | (35) | (35) | (15) | (15) |

TABLE 3-continued

|  | Comparative Example 5 | Comparative Example 6 | Comparative Example 7 | Comparative Example 8 | Example 5 | Example 6 |
|---|---|---|---|---|---|---|
| (component (b), PE) | (1.5) | (2.5) | (21) | (35) | (6) | (12) |
| (component (c), PA) | (2.5) | (2.5) | (35) | (35) | (15) | (15) |
| second elastomer (B) |  |  |  |  |  |  |
| NR | 47.5 | 47.5 | 15 | 15 | 35 | 35 |
| SBR (#1500) | 50 | 50 | 50 | 50 | 50 | 50 |
| carbon black | 45 | 45 | 45 | 45 | 45 | 45 |
| aromatic oil | 10 | 10 | 10 | 10 | 10 | 10 |
| stearic acid | 1.5 | 1.5 | 1.5 | 1.5 | 1.5 | 1.5 |
| zinc white | 3.0 | 3.0 | 3.0 | 3.0 | 3.0 | 3.0 |
| antioxidant | 2.0 | 2.0 | 2.0 | 2.0 | 2.0 | 2.0 |
| vulcanization accelerator NS * | 1.5 | 1.5 | 1.5 | 1.5 | 1.5 | 1.5 |
| sulfur | 3.0 | 3.0 | 3.0 | 3.0 | 3.0 | 3.0 |
| RT Mod 50% |  |  |  |  |  |  |
| orienting direction of short fiber (MPa) | 1.72 | 1.72 | 20.60 | 21.00 | 12.60 | 12.30 |
| direction perpendicular to orientation of short fiber (MPa) | 1.20 | 1.20 | 4.90 | 5.20 | 2.28 | 2.35 |
| index of anisotropy | 1.43 | 1.43 | 4.20 | 4.04 | 5.53 | 5.23 |
| 100° C. Mod 50% |  |  |  |  |  |  |
| orienting direction of short fiber (MPa) | 1.81 | 1.81 | 11.40 | 11.78 | 8.81 | 8.42 |
| direction perpendicular to orientation of short fiber (MPa) | 1.05 | 1.05 | 4.25 | 4.50 | 1.76 | 1.83 |
| index of anisotropy | 1.72 | 1.72 | 2.68 | 2.62 | 5.01 | 4.60 |
| Bending fatigue test (times until occurrence of crack length of 5 mm (index)) | 102 | 100 | 104 | 100 | 135 | 118 |
| Index of kneading time (damping temperature: 150° C.) (index) | 99 | 100 | 82 | 100 | 82 | 88 |
| Dispersion level in uncured rubber sheet (aggregate/cm$^2$) | 0 | 1.5 | 0 | 18.7 | 0 | 0 |

* N-tert-butyl-2-benzothiazolyl sulfenamide

EXAMPLES 7–26, COMPARATIVE EXAMPLES 9–26

Various short fiber-reinforced rubber compositions are prepared according to a compounding recipe as shown in Tables 4–10 by using various master batches shown in Table 1 in an industrial mass production type Banbury mixer of 240 liters and then shaped into rubber sheets having a thickness as shown in Tables 4–10. Thereafter, pneumatic radial tires having a tire size of 205/65R15 and a tire structure as shown in FIGS. 1 and 2 are manufactured by inserting such a rubber sheet in a given region of a sidewall portion under conditions shown in tire structures of Tables 4–10, wherein a radial carcass is comprised of a single rubberized ply containing polyethylene terephthalate cords of 1500 d/2 therein. Moreover, the conventional pneumatic radial tire having the same tire size and using no rubber sheet made of the short fiber-reinforced rubber composition is manufactured as a conventional example.

With respect to these pneumatic radial tires, the durability by a tire drum test, steering stability, ride comfort and rolling resistance (RR) are evaluated as follows.

(Tire Drum Test)

The tire to be tested is mounted onto a rim according to a method of JIS D4230-1986, 5.3.1 and run by using a testing apparatus according to JIS D4230-1986, 5.3.2 in a testing method according to a test method of JIS D4230-1986, 5.3.3. In this case, a load is increased by 5% every 24 hours after the completion of third stage to measure a running distance until the breakage of the tire. The running distance is represented by an index on the basis that a control tire is 100. Moreover, Conventional Example in Tables 4, 5, 6, 7 and 8, and Comparative Example 24 in Tables 9 and 10 are used as a control.

(Steering Stability)

The tire to be tested is mounted onto a front-wheel drive vehicle having a displacement of 2000 cc and actually run at a speed of 40 to 120 km/h under straight running and lane change conditions, during which the steering stability is evaluated by a professional driver's feeling. The evaluation is carried out by ten-point stage. Moreover, the term "+" means that the steering stability is better than a point attached with "+" but does not reach to a next point.

(Ride Comfort)

The tire to be tested is actually run at a speed of 40 to 80 km/h on good road, joint road and bad road, during which the ride comfort is evaluated by a professional driver's feeling. The evaluation is carried out by ten-point stage. The term "+" has the same meaning as mentioned above.

(Rolling Resistance)

The tire to be tested is run on a rotating drum having an outer diameter of 1.7 m under conditions that an internal pressure is 2.0 kgf/cm$^2$, a load is 440 kgf and a rim size is 6JJ. After the rotating speed is raised to 120 km/h, the motor of the drum is cut off and then inertia moment is measured when the speed reaches 80 km/h, from which the rolling resistance is calculated according to the following equation and represented by an index on the basis that a control tire is 100, wherein the larger the index value, the better the rolling resistance.

Rolling resistance=[(inertia moment of control tire)/(inertia moment of tire to be tested)]×100

Moreover, the control tire is the same as described in the tire drum test.

The thus obtained results are also shown in Tables 4 to 10.

TABLE 4

|  | Conventional Example | Example 7 | Comparative Example 9 | Example 8 | Comparative Example 10 | Example 9 | Comparative Example 11 | Example 10 |
|---|---|---|---|---|---|---|---|---|
| Short fiber-reinforced rubber composition No. | — | 1 | 2 | 3 | 4 | 5 | 6 | 7 |
| Kind of master batch | — | 2 | 4 | 2 | 4 | 2 | 4 | 2 |
| Compounding recipe (part by weight) | | | | | | | | |
| total amount of master batch (A) | — | 13 | 15 | 26 | 30 | 39 | 45 | 78 |
| (component (a), NR) | — | (5) | (5) | (10) | (10) | (15) | (15) | (30) |
| (component (b), PE) | — | (3) | (5) | (6) | (10) | (9) | (15) | (18) |
| (component (c), PA) | — | (5) | (5) | (10) | (10) | (15) | (15) | (30) |
| second elastomer (B) | | | | | | | | |
| NR | 60 | 55 | 55 | 50 | 50 | 45 | 45 | 30 |
| SBR (#1500) | 40 | 40 | 40 | 40 | 40 | 40 | 40 | 40 |
| carbon black | 45 | 45 | 45 | 45 | 45 | 45 | 45 | 45 |
| aromatic oil | 10 | 10 | 10 | 10 | 10 | 10 | 10 | 10 |
| stearic acid | 1.5 | 1.5 | 1.5 | 1.5 | 1.5 | 1.5 | 1.5 | 1.5 |
| zinc white | 3.0 | 3.0 | 3.0 | 3.0 | 3.0 | 3.0 | 3.0 | 3.0 |
| antioxidant | 2.0 | 2.0 | 2.0 | 2.0 | 2.0 | 2.0 | 2.0 | 2.0 |
| vulcanization accelerator NS *1 | 1.5 | 1.5 | 1.5 | 1.5 | 1.5 | 1.5 | 1.5 | 1.5 |
| sulfur | 3.0 | 3.0 | 3.0 | 3.0 | 3.0 | 3.0 | 3.0 | 3.0 |
| Tire structure | | | | | | | | |
| overlapping margin with bead filler (mm) *2 | +5.0/in | +5.0/in | +5.0/in | +5.0/in | +5.0/in | +5.0/in | +5.0/in | +5.0/in |
| orienting direction of short fiber with respect to circumferential direction of tire | — | 0 | 0 | 0 | 0 | 0 | 0 | 0 |
| thickness of rubber sheet (mm) | 1.0 | 1.0 | 1.0 | 1.0 | 1.0 | 1.0 | 1.0 | 1.0 |
| height of bead filler to carcass height (%) | 25.0 | 25.0 | 25.0 | 25.0 | 25.0 | 25.0 | 25.0 | 25.0 |
| insertion height of rubber sheet to carcass height (%) | 70 | 70 | 70 | 70 | 70 | 70 | 70 | 70 |
| Drum test for durability (index of running distance until occurrence of trouble) | 100 | 106 | 98 | 118 | 98 | 122 | 96 | 110 |
| Steering stability | 4.5 | 5.0+ | 5.0 | 6.0 | 5.5 | 6.5+ | 6.0 | 6.5+ |
| Ride comfort | 4.5 | 5.0+ | 5.0 | 5.5+ | 5.5 | 6.5 | 6.0 | 5.5+ |

*1: N-tert-butyl-2-benzothiazolyl sulfenamide
*2: "out" indicates an overlapped form between rubber short and bead filler shown in FIG. 1, and "in" indicates an overlapped form between rubber sheet and bead filler shown in FIG. 2.

TABLE 5

|  | Comparative Example 12 | Comparative Example 13 | Comparative Example 14 | Comparative Example 15 | Comparative Example 16 | Comparative Example 17 | Example 11 | Example 12 |
|---|---|---|---|---|---|---|---|---|
| Short fiber-reinforced rubber composition No. | 8 | 9 | 10 | 11 | 12 | 6 | 13 | 14 |
| Kind of master batch | 4 | 2 | 4 | 2 | 4 | 4 | 1 | 3 |
| Compounding recipe (part by weight) | | | | | | | | |
| total amount of master batch (A) | 90 | 6.5 | 7.5 | 91 | 105 | 45 | 36 | 42 |
| (component (a), NR) | (30) | (2.5) | (2.5) | (35) | (35) | (15) | (15) | (15) |
| (component (b), PE) | (30) | (1.5) | (2.5) | (21) | (35) | (15) | (6) | (12) |
| (component (c), PA) | (30) | (2.5) | (2.5) | (35) | (35) | (15) | (15) | (15) |
| second elastomer (B) | | | | | | | | |
| NR | 30 | 57.5 | 57.5 | 25 | 25 | 45 | 45 | 45 |
| SBR (#1500) | 40 | 40 | 40 | 40 | 40 | 40 | 40 | 40 |
| carbon black | 45 | 45 | 45 | 45 | 45 | 45 | 45 | 45 |
| aromatic oil | 10 | 10 | 10 | 10 | 10 | 10 | 10 | 10 |
| stearic acid | 1.5 | 1.5 | 1.5 | 1.5 | 1.5 | 1.5 | 1.5 | 1.5 |
| zinc white | 3.0 | 3.0 | 3.0 | 3.0 | 3.0 | 3.0 | 3.0 | 3.0 |
| antioxidant | 2.0 | 2.0 | 2.0 | 2.0 | 2.0 | 2.0 | 2.0 | 2.0 |
| vulcanization accelerator NS *1 | 1.5 | 1.5 | 1.5 | 1.5 | 1.5 | 1.5 | 1.5 | 1.5 |
| sulfur | 3.0 | 3.0 | 3.0 | 3.0 | 3.0 | 3.0 | 3.0 | 3.0 |
| Tire structure | | | | | | | | |
| overlapping margin with bead filler (mm) *2 | +5.0/in | +5.0/in | +5.0/in | +5.0/in | +5.0/in | +5.0/in | +5.0/in | +5.0/in |
| orienting direction of short fiber with respect to circumferential direction of tire | 0 | 0 | 0 | 0 | 0 | 0 | 0 | 0 |
| thickness of rubber sheet (mm) | 1.0 | 1.0 | 1.0 | 1.0 | 1.0 | 1.0 | 1.0 | 1.0 |

TABLE 5-continued

|  | Comparative Example 12 | Comparative Example 13 | Comparative Example 14 | Comparative Example 15 | Comparative Example 16 | Comparative Example 17 | Example 11 | Example 12 |
|---|---|---|---|---|---|---|---|---|
| height of bead filler to carcass height (%) | 25.0 | 25.0 | 25.0 | 25.0 | 25.0 | 25.0 | 25.0 | 25.0 |
| Insertion height of rubber sheet to carcass height (%) | 70 | 70 | 70 | 70 | 70 | 70 | 70 | 70 |
| Drum test for durability (index of running distance until occurrence of trouble) | 92 | 103 | 100 | 103 | 84 | 96 | 129 | 115 |
| Steering stability | 6.5 | 5.0 | 5.0 | 6.5 | 6.5 | 6.0 | 6.5+ | 6.5+ |
| Ride comfort | 5.5 | 5.0 | 5.0 | 5.0+ | 5.0+ | 6.0 | 6.5+ | 6.5 |

*1: N-tert-butyl-2-benzothiazolyl sulfenamide
*2: "out" indicates an overlapped form between rubber sheet and bead filler shown in FIG. 1, and "in" indicates an overlapped form between rubber sheet and bead filler shown in FIG. 2.

TABLE 6

|  | Example 13 | Example 14 | Example 15 | Example 16 | Comparative Example 18 | Comparative Example 19 | Comparative Example 20 |
|---|---|---|---|---|---|---|---|
| Short fiber-reinforced rubber composition No. | 13 | 13 | 13 | 13 | 13 | 13 | 6 |
| Kind of master batch | 1 | 1 | 1 | 1 | 1 | 1 | 4 |
| Compounding recipe (part by weight) |  |  |  |  |  |  |  |
| total amount of master batch (A) | 36 | 36 | 36 | 36 | 36 | 36 | 45 |
| (component (a), NR) | (15) | (15) | (15) | (15) | (15) | (15) | (15) |
| (component (b), PE) | (6) | (6) | (6) | (6) | (6) | (6) | (15) |
| (component (c), PA) | (15) | (15) | (15) | (15) | (15) | (15) | (15) |
| second elastomer (B) |  |  |  |  |  |  |  |
| NR | 45 | 45 | 45 | 45 | 45 | 45 | 45 |
| SBR (#1500) | 40 | 40 | 40 | 40 | 40 | 40 | 40 |
| carbon black | 45 | 45 | 45 | 45 | 45 | 45 | 45 |
| aromatic oil | 10 | 10 | 10 | 10 | 10 | 10 | 10 |
| stearic acid | 1.5 | 1.5 | 1.5 | 1.5 | 1.5 | 1.5 | 1.5 |
| zinc white | 3.0 | 3.0 | 3.0 | 3.0 | 3.0 | 3.0 | 3.0 |
| antioxidant | 2.0 | 2.0 | 2.0 | 2.0 | 2.0 | 2.0 | 2.0 |
| vulcanization accelerator NS *1 | 1.5 | 1.5 | 15. | 1.5 | 1.5 | 1.5 | 1.5 |
| sulfur | 3.0 | 3.0 | 3.0 | 3.0 | 3.0 | 3.0 | 3.0 |
| Tire structure |  |  |  |  |  |  |  |
| overlapping margin with bead filler (mm) *2 | +5.0/in | 0/in | +25.0/in | +25.0/out | −0.5 | −5.0 | −0.5 |
| orienting direction of short fiber with respect to circumferential direction of tire | 0.0 | 0.0 | 0.0 | 0.0 | 0.0 | 0.0 | 0.0 |
| thickness of rubber sheet (mm) | 1.0 | 1.0 | 1.0 | 1.0 | 1.0 | 1.0 | 1.0 |
| height of bead filler to carcass height (%) | 25.0 | 25.0 | 25.0 | 25.0 | 25.0 | 25.0 | 25.0 |
| Insertion height of rubber sheet to carcass height (%) | 70 | 70 | 70 | 70 | 70 | 70 | 70 |
| Drum test for durability (index of running distance until occurrence of trouble) | 100 | 100 | 100 | 100 | 82 | 81 | 79 |
| Steering stability | 6.5+ | 6.5+ | 6.5+ | 6.5+ | 6.0 | 6.0 | 6.0 |
| Ride comfort | 6.5+ | 6.5+ | 6.5+ | 6.5+ | 5.5 | 5.5 | 5.0+ |

*1: N-tert-butyl-2-benzothiazolyl sulfenamide
*2: "out" indicates an overlapped form between rubber sheet and bead filler shown in FIG. 1, and "in" indicates an overlapped form between rubber sheet and bead filler shown in FIG. 2.

TABLE 7

|  | Example 8 | Example 17 | Example 18 | Comparative Example 21 |
|---|---|---|---|---|
| Short fiber-reinforced rubber composition No. | 3 | 3 | 3 | 3 |
| Kind of master batch | 2 | 2 | 2 | 2 |
| Compounding recipe (part by weight) |  |  |  |  |
| total amount of master batch (A) | 26 | 26 | 26 | 26 |
| (component (a), NR) | (10) | (10) | (10) | (10) |
| (component (b), PE) | (6) | (6) | (6) | (6) |
| (component (c), PA) | (10) | (10) | (10) | (10) |

TABLE 7-continued

|  | Example 8 | Example 17 | Example 18 | Comparative Example 21 |
|---|---|---|---|---|
| second elastomer (B) | | | | |
| NR | 50 | 50 | 50 | 50 |
| SBR (#1500) | 40 | 40 | 40 | 40 |
| carbon black | 45 | 45 | 45 | 45 |
| aromatic oil | 10 | 10 | 10 | 10 |
| stearic acid | 1.5 | 1.5 | 1.5 | 1.5 |
| zinc white | 3.0 | 3.0 | 3.0 | 3.0 |
| antioxidant | 2.0 | 2.0 | 2.0 | 2.0 |
| vulcanization accelerator NS *1 | 1.5 | 1.5 | 1.5 | 1.5 |
| sulfur | 3.0 | 3.0 | 3.0 | 3.0 |
| Tire structure | | | | |
| overlapping margin with bead filler (mm) *2 | +5.0/in | +5.0/in | +5.0/in | +5.0/in |
| orienting direction of short fiber with respect to circumferential direction of tire | 0.0 | 22.5 | 45.0 | 67.5 |
| thickness of rubber sheet (mm) | 1.0 | 1.0 | 1.0 | 1.0 |
| height of bead filler to carcass height (%) | 25.0 | 25.0 | 25.0 | 25.0 |
| insertion height of rubber sheet to carcass height (%) | 70 | 70 | 70 | 70 |
| Drum test for durability (index of running distance until occurrence of trouble) | 100 | 100 | 100 | 95 |
| Steering stability | 6.0 | 6.0+ | 6.0+ | 6.0 |
| Ride comfort | 5.5+ | 5.5 | 5.5 | 5.0 |
| RR (rolling resistance) | 100 | 100 | 100 | 97 |

*1: N-tert-butyl-2-benzothiazolyl sulfenamide
*2: "out" indicates an overlapped form between rubber sheet and bead filler shown in FIG. 1, and "in" indicates an overlapped form between rubber sheet and bead filler shown in FIG. 2.

TABLE 8

|  | Example 9 | Comparative Example 22 | Example 19 | Example 20 | Comparative Example 23 |
|---|---|---|---|---|---|
| Short fiber-reinforced rubber composition No. | 5 | 5 | 5 | 5 | 5 |
| Kind of master batch | 2 | 2 | 2 | 2 | 2 |
| Compounding recipe (part by weight) | | | | | |
| total amount of master batch (A) | 39 | 39 | 39 | 39 | 39 |
| (component (a), NR) | (15) | (15) | (15) | (15) | (15) |
| (component (b), PE) | (9) | (9) | (9) | (9) | (9) |
| (component (c), PA) | (15) | (15) | (15) | (15) | (15) |
| second elastomer (B) | | | | | |
| NR | 45 | 45 | 45 | 45 | 45 |
| SBR (#1500) | 40 | 40 | 40 | 40 | 40 |
| carbon black | 45 | 45 | 45 | 45 | 45 |
| aromatic oil | 10 | 10 | 10 | 10 | 10 |
| stearic acid | 1.5 | 1.5 | 1.5 | 1.5 | 1.5 |
| zinc white | 3.0 | 3.0 | 3.0 | 3.0 | 3.0 |
| antioxidant | 2.0 | 2.0 | 2.0 | 2.0 | 2.0 |
| vulcanization accelerator NS *1 | 1.5 | 1.5 | 1.5 | 1.5 | 1.5 |
| sulfur | 3.0 | 3.0 | 3.0 | 3.0 | 3.0 |
| Tire structure | | | | | |
| overlapping margin with bead filler (mm) *2 | +5.0/in | +5.0/in | +5.0/in | +5.0/in | +5.0/in |
| orienting direction of short fiber with respect to circumferential direction of tire | 0.0 | 0.0 | 0.0 | 0.0 | 0.0 |
| thickness of rubber sheet (mm) | 1.0 | 0.3 | 0.5 | 2.0 | 2.5 |
| height of bead filler to carcass height (%) | 25.0 | 25.0 | 25.0 | 25.0 | 25.0 |
| insertion height of rubber sheet to carcass height (%) | 70 | 70 | 70 | 70 | 70 |
| Drum test for durability (index of running distance until occurrence of trouble) | 100 | 94 | 100 | 100 | 100 |
| Steering stability | 6.5+ | 5.0 | 6.5 | 7.0 | 7.0 |
| Ride comfort | 6.5 | 5.0 | 6.0+ | 6.0+ | 5.0 |
| RR (rolling resistance) | 100 | 104 | 103 | 100 | 96 |

*1: N-tert-butyl-2-benzothiazolyl sulfenamide
*2: "out" indicates an overlapped form between rubber sheet and bead filler shown in FIG. 1, and "in" indicates an overlapped form between rubber sheet and bead filler shown in FIG. 2.

TABLE 9

|  | Comparative Example 24 | Comparative Example 25 | Example 21 | Example 22 |
| --- | --- | --- | --- | --- |
| Short fiber-reinforced rubber composition No. | — | 13 | 13 | 13 |
| Kind of master batch | — | 1 | 1 | 1 |
| Compounding recipe (part by weight) | | | | |
| total amount of master batch (A) | — | 36 | 36 | 36 |
| (component (a), NR) | — | (15) | (15) | (15) |
| (component (b), PE) | — | (6) | (6) | (6) |
| (component (c), PA) | — | (15) | (15) | (15) |
| second elastomer (B) | | | | |
| NR | 60 | 45 | 45 | 45 |
| SBR (#1500) | 40 | 40 | 40 | 40 |
| carbon black | 45 | 45 | 45 | 45 |
| aromatic oil | 10 | 10 | 10 | 10 |
| stearic acid | 1.5 | 1.5 | 1.5 | 1.5 |
| zinc white | 3.0 | 3.0 | 3.0 | 3.0 |
| antioxidant | 2.0 | 2.0 | 2.0 | 2.0 |
| vulcanization accelerator NS *1 | 1.5 | 1.5 | 1.5 | 1.5 |
| sulfur | 3.0 | 3.0 | 3.0 | 3.0 |
| Tire structure | | | | |
| overlapping margin with bead filler (mm) *2 | +5.0/out | +5.0/out | +5.0/out | +5.0/out |
| orienting direction of short fiber with respect to circumferential direction of tire | — | 0.0 | 0.0 | 0.0 |
| thickness of rubber sheet (mm) | 1.0 | 1.0 | 1.0 | 1.0 |
| height of bead filler to carcass height (%) | 30 | 30 | 30 | 30 |
| insertion height of rubber sheet to carcass height (%) | 70 | 98 | 94 | 80 |
| Drum test for durability (index of running distance until occurrence of trouble) | 100 | 94 | 100 | 105 |
| Steering stability | 5.0 | 6.5 | 6.5+ | 6.5+ |
| Ride comfort | 5.0 | 5.5 | 6.5 | 6.5+ |
| RR (rolling resistance) | 100 | 98 | 100 | 100 |

*1: N-tert-butyl-2-benzothiazolyl sulfenamide
*2: "out" indicates an overlapped form between rubber sheet and bead filler shown in FIG. 1, and "in" indicates an overlapped form between rubber sheet and bead filler shown in FIG. 2.

TABLE 10

|  | Example 23 | Example 24 | Example 25 | Example 26 | Comparative Example 26 |
| --- | --- | --- | --- | --- | --- |
| Short fiber-reinforced rubber composition No. | 13 | 13 | 13 | 13 | 13 |
| Kind of master batch | 1 | 1 | 1 | 1 | 1 |
| Compounding recipe (part by weight) | | | | | |
| total amount of master batch (A) | 36 | 36 | 36 | 36 | 36 |
| (component (a), NR) | (15) | (15) | (15) | (15) | (15) |
| (component (b), PE) | (6) | (6) | (6) | (6) | (6) |
| (component (c), PA) | (15) | (15) | (15) | (15) | (15) |
| second elastomer (B) | | | | | |
| NR | 45 | 45 | 45 | 45 | 45 |
| SBR (#1500) | 40 | 40 | 40 | 40 | 40 |
| carbon black | 45 | 45 | 45 | 45 | 45 |
| aromatic oil | 10 | 10 | 10 | 10 | 10 |
| stearic acid | 1.5 | 1.5 | 1.5 | 1.5 | 1.5 |
| zinc white | 3.0 | 3.0 | 3.0 | 3.0 | 3.0 |
| antioxidant | 2.0 | 2.0 | 2.0 | 2.0 | 2.0 |
| vulcanization accelerator NS *1 | 1.5 | 1.5 | 1.5 | 1.5 | 1.5 |
| sulfur | 3.0 | 3.0 | 3.0 | 3.0 | 3.0 |
| Tire structure | | | | | |
| overlapping margin with bead filler (mm) *2 | +5.0/out | +5.0/out | +5.0/out | +5.0/out | +5.0/out |
| orienting direction of short fiber with respect to circumferential direction of tire | 0.0 | 0.0 | 0.0 | 0.0 | 0.0 |
| thickness of rubber sheet (mm) | 1.0 | 1.0 | 1.0 | 1.0 | 1.0 |
| height of bead filler to carcass height (%) | 30 | 30 | 30 | 30 | 30 |
| insertion height of rubber sheet to carcass height (%) | 70 | 60 | 40 | 35 | 30 |
| Drum test for durability (index of running distance until occurrence of trouble) | 108 | 104 | 102 | 100 | 100 |
| Steering stability | 6.5+ | 6.0 | 5.5+ | 5.5 | 5.0 |

TABLE 10-continued

|  | Example 23 | Example 24 | Example 25 | Example 26 | Comparative Example 26 |
|---|---|---|---|---|---|
| Ride comfort | 6.5+ | 5.5+ | 5.5 | 5.0+ | 5.0 |
| RR (rolling resistance) | 100 | 100 | 100 | 100 | 100 |

*1: N-tert-butyl-2-benzothiazolyl sulfenamide
*2: "out" indicates an overlapped form between rubber sheet and bead filler shown in FIG. 1, and "in" indicates an overlapped form between rubber sheet and bead filler shown in FIG. 2.

EXAMPLES 27–43, COMPARATIVE EXAMPLES 27–43

Various short fiber-reinforced rubber compositions are prepared according to a compounding recipe as shown in Tables 11–17 by using various master batches shown in Table 1 in an industrial mass production type Banbury mixer of 240 liters and then shaped into rubber sheets having a thickness as shown in Tables 11–17. Thereafter, pneumatic radial tires having a tire size of 205/65R15 and a tire structure as shown in FIG. 3 are manufactured by inserting such a rubber sheet in a given region of a sidewall portion under conditions shown in tire structures of Tables 11–17, wherein a radial carcass is comprised of a single rubberized ply containing polyethylene terephthalate cords of 1500 d/2 therein. Moreover, the conventional pneumatic radial tire having the same tire size and using no rubber sheet made of the short fiber-reinforced rubber composition is manufactured as a conventional example.

With respect to these pneumatic radial tires, the durability by a tire drum test, steering stability, ride comfort and rolling resistance (RR) are evaluated in the same manners as described in Example 7. In this case, Conventional Example in Tables 11, 14 and 16 are used as a control.

TABLE 11

|  | Conventional Example | Example 27 | Comparative Example 27 | Example 28 | Comparative Example 28 | Example 29 | Comparative Example 29 | Example 30 |
|---|---|---|---|---|---|---|---|---|
| Short fiber-reinforced rubber composition No. | — | 1 | 2 | 3 | 4 | 5 | 6 | 7 |
| Kind of master batch | — | 2 | 4 | 2 | 4 | 2 | 4 | 2 |
| Compounding (part by weight) |  |  |  |  |  |  |  |  |
| total amount of master batch (A) | — | 13 | 15 | 26 | 30 | 39 | 45 | 78 |
| (component (a), NR) | — | (5) | (5) | (10) | (10) | (15) | (15) | (30) |
| (component (b), PE) | — | (3) | (5) | (6) | (10) | (9) | (15) | (18) |
| (component (c), PA) | — | (5) | (5) | (10) | (10) | (15) | (15) | (30) |
| second elastomer (B) |  |  |  |  |  |  |  |  |
| NR | 60 | 55 | 55 | 50 | 50 | 45 | 45 | 30 |
| SBR (#1500) | 40 | 40 | 40 | 40 | 40 | 40 | 40 | 40 |
| carbon black | 45 | 45 | 45 | 45 | 45 | 45 | 45 | 45 |
| aromatic oil | 10 | 10 | 10 | 10 | 10 | 10 | 10 | 10 |
| stearic acid | 1.5 | 1.5 | 1.5 | 1.5 | 1.5 | 1.5 | 1.5 | 1.5 |
| zinc white | 3.0 | 3.0 | 3.0 | 3.0 | 3.0 | 3.0 | 3.0 | 3.0 |
| antioxidant | 2.0 | 2.0 | 2.0 | 2.0 | 2.0 | 2.0 | 2.0 | 2.0 |
| vulcanization accelerator NS * | 1.5 | 1.5 | 1.5 | 1.5 | 1.5 | 1.5 | 1.5 | 1.5 |
| sulfur | 3.0 | 3.0 | 3.0 | 3.0 | 3.0 | 3.0 | 3.0 | 3.0 |
| Tire structure |  |  |  |  |  |  |  |  |
| overlapping margin with turnup end of carcass (mm) | +15.0 | +15.0 | +15.0 | +15.0 | +15.0 | +15.0 | +15.0 | +15.0 |
| orienting direction of short fiber with respect to circumferential direction of tire | — | 0 | 0 | 0 | 0 | 0 | 0 | 0 |
| thickness of rubber sheet (mm) | 1.0 | 1.0 | 1.0 | 1.0 | 1.0 | 1.0 | 1.0 | 1.0 |
| height of turnup end to carcass height (%) | 40.0 | 40.0 | 40.0 | 40.0 | 40.0 | 40.0 | 40.0 | 40.0 |
| insertion height of rubber sheet to carcass height (%) | 75 | 75 | 75 | 75 | 75 | 75 | 75 | 75 |
| Drum test for durability (index of running distance until occurrence of trouble) | 100 | 101 | 99 | 103 | 97 | 106 | 95 | 108 |
| Steering stability | 5.0 | 5.0+ | 5.0 | 5.5 | 5.0+ | 6.0+ | 5.5 | 6.0+ |
| Ride comfort | 5.0 | 5.0+ | 5.0 | 5.5 | 5.0+ | 6.0 | 5.5 | 5.5 |

* N-tert-butyl-2-benzothiazolyl sulfenamide

TABLE 12

|  | Comparative Example 30 | Comparative Example 31 | Comparative Example 32 | Comparative Example 33 | Comparative Example 34 | Comparative Example 35 | Example 31 | Example 32 |
|---|---|---|---|---|---|---|---|---|
| Short fiber-reinforced rubber composition No. | 8 | 9 | 10 | 11 | 12 | 6 | 13 | 14 |
| Kind of master batch | 4 | 2 | 4 | 2 | 4 | 4 | 1 | 3 |
| Compounding (part by weight) | | | | | | | | |
| total amount of master batch (A) | 90 | 6.5 | 7.5 | 91 | 105 | 45 | 36 | 42 |
| (component (a), NR) | (30) | (2.5) | (2.5) | (35) | (35) | (15) | (15) | (15) |
| (component (b), PE) | (30) | (1.5) | (2.5) | (21) | (35) | (15) | (6) | (12) |
| (component (c), PA) | (30) | (2.5) | (2.5) | (35) | (35) | (15) | (15) | (15) |
| second elastomer (B) | | | | | | | | |
| NR | 30 | 57.5 | 57.5 | 25 | 25 | 45 | 45 | 45 |
| SBR (#1500) | 40 | 40 | 40 | 40 | 40 | 40 | 40 | 40 |
| carbon black | 45 | 45 | 45 | 45 | 45 | 45 | 45 | 45 |
| aromatic oil | 10 | 10 | 10 | 10 | 10 | 10 | 10 | 10 |
| stearic acid | 1.5 | 1.5 | 1.5 | 1.5 | 1.5 | 1.5 | 1.5 | 1.5 |
| zinc white | 3.0 | 3.0 | 3.0 | 3.0 | 3.0 | 3.0 | 3.0 | 3.0 |
| antioxidant | 2.0 | 2.0 | 2.0 | 2.0 | 2.0 | 2.0 | 2.0 | 2.0 |
| vulcanization accelerator NS * | 1.5 | 1.5 | 1.5 | 1.5 | 1.5 | 1.5 | 1.5 | 1.5 |
| sulfur | 3.0 | 3.0 | 3.0 | 3.0 | 3.0 | 3.0 | 3.0 | 3.0 |
| Tire structure | | | | | | | | |
| overlapping margin with turnup end of carcass (mm) | +15.0 | +15.0 | +15.0 | +15.0 | +15.0 | +15.0 | +15.0 | +15.0 |
| orienting direction of short fiber with respect to circumferential direction of tire | 0 | 0 | 0 | 0 | 0 | 0 | 0 | 0 |
| thickness of rubber sheet (mm) | 1.0 | 1.0 | 1.0 | 1.0 | 1.0 | 1.0 | 1.0 | 1.0 |
| height of turnup end to carcass height (%) | 40.0 | 40.0 | 40.0 | 40.0 | 40.0 | 40.0 | 40.0 | 40.0 |
| insertion height of rubber sheet to carcass height (%) | 75 | 75 | 75 | 75 | 75 | 75 | 75 | 75 |
| Drum test for durability (index of running distance until occurrence of trouble) | 85 | 100 | 100 | 98 | 81 | 95 | 108 | 104 |
| Steering stability | 6.0 | 5.0 | 5.0 | 6.0+ | 6.0+ | 5.5 | 6.5+ | 6.0 |
| Ride comfort | 5.5 | 5.0 | 5.0 | 5.0+ | 5.0+ | 5.5 | 6.5 | 6.0 |

* N-tert-butyl-2-benzothiazolyl sulfenamide

TABLE 13

|  | Example 31 | Example 33 | Example 34 | Comparative Example 35 | Comparative Example 36 | Comparative Example 37 | Comparative Example 38 |
|---|---|---|---|---|---|---|---|
| Short fiber-reinforced rubber composition No. | 13 | 13 | 13 | 13 | 13 | 13 | 6 |
| Kind of master batch | 1 | 1 | 1 | 1 | 1 | 1 | 4 |
| Compounding recipe (part by weight) | | | | | | | |
| total amount of master batch (A) | 36 | 36 | 36 | 36 | 36 | 36 | 45 |
| (component (a), NR) | (15) | (15) | (15) | (15) | (15) | (15) | (15) |
| (component (b), PE) | (6) | (6) | (6) | (6) | (6) | (6) | (15) |
| (component (c), PA) | (15) | (15) | (15) | (15) | (15) | (15) | (15) |
| second elastomer (B) | | | | | | | |
| NR | 45 | 45 | 45 | 45 | 45 | 45 | 45 |
| SBR (#1500) | 40 | 40 | 40 | 40 | 40 | 40 | 40 |
| carbon black | 45 | 45 | 45 | 45 | 45 | 45 | 45 |
| aromatic oil | 10 | 10 | 10 | 10 | 10 | 10 | 10 |
| stearic acid | 1.5 | 1.5 | 1.5 | 1.5 | 1.5 | 1.5 | 1.5 |
| zinc white | 3.0 | 3.0 | 3.0 | 3.0 | 3.0 | 3.0 | 3.0 |
| antioxidant | 2.0 | 2.0 | 2.0 | 2.0 | 2.0 | 2.0 | 2.0 |
| vulcanization accelerator NS * | 1.5 | 1.5 | 1.5 | 1.5 | 1.5 | 1.5 | 1.5 |
| sulfur | 3.0 | 3.0 | 3.0 | 3.0 | 3.0 | 3.0 | 3.0 |
| Tire structure | | | | | | | |
| overlapping margin with turnup end of carcass (mm) | +15.0 | +5.0 | +0.5 | 0 | −0.5 | −5.0 | −0.5 |
| orienting direction of short fiber with respect to circumferential direction of tire | 0.0 | 0.0 | 0.0 | 0.0 | 0.0 | 0.0 | 0.0 |

TABLE 13-continued

|  | Example 31 | Example 33 | Example 34 | Comparative Example 35 | Comparative Example 36 | Comparative Example 37 | Comparative Example 38 |
|---|---|---|---|---|---|---|---|
| thickness of rubber sheet (mm) | 1.0 | 1.0 | 1.0 | 1.0 | 1.0 | 1.0 | 1.0 |
| height of turnup end to carcass height (%) | 40.0 | 40.0 | 40.0 | 40.0 | 40.0 | 40.0 | 40.0 |
| insertion height of rubber sheet to carcass height (%) | 75 | 75 | 75 | 75 | 75 | 75 | 75 |
| Drum test for durability (index of running distance until occurrence of trouble) | 100 | 100 | 100 | 91 | 88 | 86 | 83 |
| Steering stability | 6.5+ | 6.5+ | 6.5+ | 5.5+ | 5.5 | 5.5 | 5.5 |
| Ride comfort | 6.5 | 6.5 | 6.5 | 5.5 | 5.5 | 5.5 | 5.0+ |

* N-tert-butyl-2-benzothiazolyl sulfenamide

TABLE 14

|  | Conventional Example | Example 28 | Example 35 | Example 36 | Comparative Example 39 |
|---|---|---|---|---|---|
| Short fiber-reinforced rubber composition No. | — | 3 | 3 | 3 | 3 |
| Kind of master batch | — | 2 | 2 | 2 | 2 |
| Compounding recipe (part by weight) | | | | | |
| total amount of master batch (A) | — | 26 | 26 | 26 | 26 |
| (component (a), NR) | — | (10) | (10) | (10) | (10) |
| (component (b), PE) | — | (6) | (6) | (6) | (6) |
| (component (c), PA) | — | (10) | (10) | (10) | (10) |
| second elastomer (B) | | | | | |
| NR | 60 | 50 | 50 | 50 | 50 |
| SBR (#1500) | 40 | 40 | 40 | 40 | 40 |
| carbon black | 45 | 45 | 45 | 45 | 45 |
| aromatic oil | 10 | 10 | 10 | 10 | 10 |
| stearic acid | 1.5 | 1.5 | 1.5 | 1.5 | 1.5 |
| zinc white | 3.0 | 3.0 | 3.0 | 3.0 | 3.0 |
| antioxidant | 2.0 | 2.0 | 2.0 | 2.0 | 2.0 |
| vulcanization accelerator NS * | 1.5 | 1.5 | 1.5 | 1.5 | 1.5 |
| sulfur | 3.0 | 3.0 | 3.0 | 3.0 | 3.0 |
| Tire structure | | | | | |
| overlapping margin with turnup end of carcass (mm | +15.0 | +15.0 | +15.0 | +15.0 | +15.0 |
| orienting direction of short fiber with respect to circumferential direction of tire | — | 0.0 | 22.5 | 45.0 | 67.5 |
| thickness of rubber sheet (mm) | 1.0 | 1.0 | 1.0 | 1.0 | 1.0 |
| height of turnup end to carcass height (%) | 40.0 | 40.0 | 40.0 | 40.0 | 40.0 |
| insertion height of rubber sheet to carcass height (%) | 75 | 75 | 75 | 75 | 75 |
| Drum test for durability (index of running distance until occurrence of trouble) | 100 | 103 | 102 | 100 | 96 |
| Steering stability | 5.0 | 6.0 | 6.0+ | 6.0+ | 5.5 |
| Ride comfort | 5.0 | 6.0 | 5.5+ | 5.5 | 5.0 |
| RR (rolling resistance) | 100 | 100 | 100 | 100 | 98 |

* N-tert-butyl-2-benzothiazolyl sulfenamide

TABLE 15

|  | Example 29 | Comparative Example 40 | Example 37 | Example 38 | Comparative Example 41 |
|---|---|---|---|---|---|
| Short fiber-reinforced rubber composition No. | 5 | 5 | 5 | 5 | 5 |
| Kind of master batch | 2 | 2 | 2 | 2 | 2 |
| Compounding recipe (part by weight) | | | | | |
| total amount of master batch (A) | 39 | 39 | 39 | 39 | 39 |
| (component (a), NR) | (15) | (15) | (15) | (15) | (15) |
| (component (b), PE) | (9) | (9) | (9) | (9) | (9) |
| (component (c), PA) | (15) | (15) | (15) | (15) | (15) |
| second elastomer (B) | | | | | |
| NR | 45 | 45 | 45 | 45 | 45 |
| SBR (#1500) | 40 | 40 | 40 | 40 | 40 |
| carbon black | 45 | 45 | 45 | 45 | 45 |
| aromatic oil | 10 | 10 | 10 | 10 | 10 |

TABLE 15-continued

|  | Example 29 | Comparative Example 40 | Example 37 | Example 38 | Comparative Example 41 |
|---|---|---|---|---|---|
| stearic acid | 1.5 | 1.5 | 1.5 | 1.5 | 1.5 |
| zinc white | 3.0 | 3.0 | 3.0 | 3.0 | 3.0 |
| antioxidant | 2.0 | 2.0 | 2.0 | 2.0 | 2.0 |
| vulcanization accelerator NS * | 1.5 | 1.5 | 1.5 | 1.5 | 1.5 |
| sulfur | 3.0 | 3.0 | 3.0 | 3.0 | 3.0 |
| Tire structure |  |  |  |  |  |
| overlapping margin with turnup end of carcass (mm | +15.0 | +15.0 | +15.0 | +15.0 | +15.0 |
| orienting direction of short fiber with respect to circumferential direction of tire | 0.0 | 0.0 | 0.0 | 0.0 | 0.0 |
| thickness of rubber sheet (mm) | 1.0 | 0.3 | 0.5 | 2.0 | 2.5 |
| height of turnup end to carcass height (%) | 40.0 | 40.0 | 40.0 | 40.0 | 40.0 |
| insertion height of rubber sheet to carcass height (%) | 75 | 75 | 75 | 75 | 75 |
| Drum test for durability (index of running distance until occurrence of trouble) | 100 | 98 | 100 | 100 | 100 |
| Steering stability | 6.0+ | 5.0 | 5.5+ | 6.0 | 6.0 |
| Ride comfort | 6.0 | 5.0 | 5.5+ | 6.0+ | 5.5+ |
| RR (rolling resistance) | 100 | 102 | 101 | 100 | 98 |

* N-tert-butyl-2-benzothiazolyl sulfenamide

TABLE 16

|  | Conventional Example | Comparative Example 42 | Example 39 | Example 40 | Example 31 |
|---|---|---|---|---|---|
| Short fiber-reinforced rubber composition No. | — | 13 | 13 | 13 | 13 |
| Kind of master batch | — | 1 | 1 | 1 | 1 |
| Compounding recipe (part by weight) |  |  |  |  |  |
| total amount of master batch (A) | — | 36 | 36 | 36 | 36 |
| (component (a), NR) | — | (15) | (15) | (15) | (15) |
| (component (b), PE) | — | (6) | (6) | (6) | (6) |
| (component (c), PA) | — | (15) | (15) | (15) | (15) |
| second elastomer (B) |  |  |  |  |  |
| NR | 60 | 45 | 45 | 45 | 45 |
| SBR (#1500) | 40 | 40 | 40 | 40 | 40 |
| carbon black | 45 | 45 | 45 | 45 | 45 |
| aromatic oil | 10 | 10 | 10 | 10 | 10 |
| stearic acid | 1.5 | 1.5 | 1.5 | 1.5 | 1.5 |
| zinc white | 3.0 | 3.0 | 3.0 | 3.0 | 3.0 |
| antioxidant | 2.0 | 2.0 | 2.0 | 2.0 | 2.0 |
| vulcanization accelerator NS * | 1.5 | 1.5 | 1.5 | 1.5 | 1.5 |
| sulfur | 3.0 | 3.0 | 3.0 | 3.0 | 3.0 |
| Tire structure |  |  |  |  |  |
| overlapping margin with turnup end of carcass (mm | +15.0 | +15.0 | +15.0 | 15.0 | +15.0 |
| orienting direction of short fiber with respect to circumferential direction of tire | — | 0.0 | 0.0 | 0.0 | 0.0 |
| thickness of rubber sheet (mm) | 1.0 | 1.0 | 1.0 | 1.0 | 1.0 |
| height of turnup end to carcass height (%) | 40 | 40 | 40 | 40 | 40 |
| insertion height of rubber sheet to carcass height (%) | 75 | 98 | 94 | 80 | 75 |
| Drum test for durability (index of running distance until occurrence of trouble) | 100 | 94 | 100 | 105 | 108 |
| Steering stability | 5.0 | 6.5 | 6.5 | 6.5+ | 6.5+ |
| Ride comfort | 5.0 | 5.5 | 6.0 | 6.5 | 6.5 |
| RR (rolling resistance) | 100 | 98 | 100 | 100 | 100 |

* N-tert-butyl-2-benzothiazolyl sulfenamide

TABLE 17

|  | Example 41 | Example 42 | Example 43 | Comparative Example 43 |
|---|---|---|---|---|
| Short fiber-reinforced rubber composition No. | 13 | 13 | 13 | 13 |
| Kind of master batch | 1 | 1 | 1 | 1 |

TABLE 17-continued

|  | Example 41 | Example 42 | Example 43 | Comparative Example 43 |
|---|---|---|---|---|
| Compounding recipe (part by weight) | | | | |
| total amount of master batch (A) | 36 | 36 | 36 | 36 |
| (component (a), NR) | (15) | (15) | (15) | (15) |
| (component (b), PE) | (6) | (6) | (6) | (6) |
| (component (c), PA) | (15) | (15) | (15) | (15) |
| second elastomer (B) | | | | |
| NR | 45 | 45 | 45 | 45 |
| SBR (#1500) | 40 | 40 | 40 | 40 |
| carbon black | 45 | 45 | 45 | 45 |
| aromatic oil | 10 | 10 | 10 | 10 |
| stearic acid | 1.5 | 1.5 | 1.5 | 1.5 |
| zinc white | 3.0 | 3.0 | 3.0 | 3.0 |
| antioxidant | 2.0 | 2.0 | 2.0 | 2.0 |
| vulcanization accelerator NS * | 1.5 | 1.5 | 1.5 | 1.5 |
| sulfur | 3.0 | 3.0 | 3.0 | 3.0 |
| Tire structure | | | | |
| overlapping margin with turnup end of carcass (mm) | +15.0 | +15.0 | +15.0 | +15.0 |
| orienting direction of short fiber with respect to circumferential direction of tire | 0.0 | 0.0 | 0.0 | 0.0 |
| thickness of rubber sheet (mm) | 1.0 | 1.0 | 1.0 | 1.0 |
| height of turnup end to carcass height (%) | 40 | 40 | 40 | 40 |
| insertion height of rubber sheet to carcass height (%) | 60 | 50 | 45 | 40 |
| Drum test for durability (index of running distance until occurrence of trouble) | 104 | 102 | 100 | 100 |
| Steering stability | 6.0 | 5.5+ | 5.5 | 5.0 |
| Ride comfort | 5.5+ | 5.5 | 5.0+ | 5.0 |
| RR (rolling resistance) | 100 | 100 | 100 | 100 |

* N-tert-butyl-2-benzothiazolyl sulfenamide

As mentioned above, the short fiber-reinforced rubber composition according to the invention is excellent in the workability of the industrial mass production scale and develops excellent effects on the durability and anisotropy. Further, in the pneumatic radial tires according to the invention using, the rubber sheet made of the above short fiber-reinforced rubber composition is inserted in a given region of the sidewall portion, whereby the stiffness of the sidewall portion is enhanced without damaging the properties inherent to the radial tire and the durability and complicating the production method and hence the steering stability and the ride comfort can simultaneously be established and the rolling resistance can be reduced.

What is claimed is:

1. A short fiber-reinforced rubber composition comprising; a master batch (A) comprised of (a) a first diene-based elastomer, (b) a polyolefin having a melting point of 100–150° C. and (c) short fibers of a thermoplastic polymer having amide group in its main chain, wherein the component (c) is dispersed into a matrix formed by dispersing less than 100 parts by weight of the component (b) into 100 parts by weight of a continuous phase of the component (a), and a second diene-based elastomer (B) kneaded with the master batch (A), in which the amount of the component (c) is 5–30 parts by weight based on 100 parts by weight in total of the first diene-based elastomer and the second diene-based elastomer.

2. The short fiber-reinforced rubber composition according to claim 1, wherein the component (c) is chemically bonded to both the components (a) and (b).

3. The short fiber-reinforced rubber composition according to claim 1, wherein the component (c) has an average diameter of 0.05–1.0 p.m and a ratio of average length to average diameter of 10–2000.

4. The short fiber-reinforced rubber composition according to claim 1, wherein the amount of the component (b) occupied in 100 parts by weight of the continuous phase of the component (a) is less than 85 parts by weight.

5. The short fiber-reinforced rubber composition according to claim 4, wherein the amount of the component (b) occupied in the component (a) is less than 65 parts by weight.

6. The short fiber-reinforced rubber composition according to claim 5, wherein the amount of the component (b) in the component (a) is less than 45 parts by weight.

7. The short fiber-reinforced rubber composition according to claim 1, wherein the amount of the component (c) occupied in 100 parts by weight of the continuous phase of the component (a) is not less than 50 parts by weight but less than 110 parts by weight.

8. The short fiber-reinforced rubber composition according to claim 7, wherein the amount of the component (c) occupied in 100 parts by weight of the continuous phase of the component (a) is not less than 50 parts by weight but less than 110 parts by weight.

* * * * *